(12) United States Patent
Iijima et al.

(10) Patent No.: US 7,711,726 B2
(45) Date of Patent: May 4, 2010

(54) METHOD, SYSTEM AND PROGRAM FOR CREATING AN INDEX

(75) Inventors: Michio Iijima, Tokyo (JP); Yukio Nakano, Oyama (JP)

(73) Assignee: Hitachi, Ltd., Tokyo (JP)

( * ) Notice: Subject to any disclaimer, the term of this patent is extended or adjusted under 35 U.S.C. 154(b) by 376 days.

(21) Appl. No.: 11/689,562

(22) Filed: Mar. 22, 2007

(65) Prior Publication Data
US 2008/0120280 A1 May 22, 2008

(51) Int. Cl.
*G06F 17/00* (2006.01)
(52) U.S. Cl. .................. 707/711; 707/741
(58) Field of Classification Search .............. None
See application file for complete search history.

(56) References Cited

U.S. PATENT DOCUMENTS 6,105,022 A  8/2000  Takahashi et al.

2001/0007987 A1 * 7/2001 Igata ....................... 707/3

FOREIGN PATENT DOCUMENTS

| JP | 10-293790 | 4/1998 |
|----|-----------|--------|
| JP | 2006-155584 | 6/2006 |
| JP | 2006-215986 | 8/2006 |

* cited by examiner

*Primary Examiner*—Charles Rones
*Assistant Examiner*—Belix M Ortiz
(74) *Attorney, Agent, or Firm*—Antonelli, Terry, Stout & Kraus, LLP.

(57) ABSTRACT

A method for creating an index for searching a structured document having a document data-structure stored, in a computer. The method to be performed in the computer for creating an index includes the steps of: analyzing a structured document to extract a document data-structure in the structured document; normalizing the extracted document data-structure to create a logical structure index composed of a plurality of elements having a hierarchical structure; extracting an appearance number of each element in the created logical structure index; and extracting elements for creating the index, based on the logical structure index, by comparing the extracted element appearance number and a first predetermined threshold.

11 Claims, 27 Drawing Sheets

FIG. 3

Example of XML document

```
<Book information>
<Magazine><Price>Y560</Price></Magazine>
</Used>
    <Book><Price>Y200</Price></Book>
</Used>
<New-secondhand>
    <Magazine><Price>Y360</Price>
            <Price>Y300</Price><Magazine>
<New-secondhand>
</Book information>
```

- 2010 `<Book information>`
- 2020 `<Magazine><Price>Y560</Price></Magazine>` — 2050
- 2030 `</Used>`
- 2040 `<New-secondhand>` — 2070
- 2060 `<Magazine><Price>Y360</Price>` ... — 2080

FIG. 4

Example of XML document

```
<Book information>
<Magazine>
    <Price>Y780</Price>
</Magazine>
</Used>
    <Magazine>
        <Price>Y580</Price>
    <Magazine>
</Used>
</Book information>
```

- 7010 `<Book information>`
- 7020 `<Magazine>`
- 7030 `</Magazine>` / `</Used>` — 7040

Example of structural analysis tree created from XML document

Example of structural analysis tree created from XML document

Example of logical structure index

Example of logical structure index

FIG. 13

Path appearance position management information 1160

| Path condition | Appearance position | Appearance number |
|---|---|---|
| //Magazine | 1, 9 | 2 |
| //Used | 3 | 1 |
| //Price | 2, 5, 10 | 3 |
| ... | ... | ... |
| //New-secondhand | 8 | 1 |

FIG. 15

Value index definition management information 1170

| Indexing target path | Creation status |
|---|---|
| /Book information/Magazine/Price | Created |
| /Book information/Used/Book/Price | Not created |
| /Book information/New-secondhand/Book/Price | Not created |
| ⋮ | ⋮ |
| /Book information/Magazine/Price, /Bookinformation/Used/Book/Price, /Book information/New-secondhand/Book/Price | Not created |
| ⋮ | ⋮ |

6010 — Indexing target path
6020 — Creation status

FIG. 20

Confirmation of value index creation

| Indexing target path | Creation status | Need creation? |
|---|---|---|
| /Book information/Magazine/Price | Created | |
| /Book information/Used/Book/Price | Not created | ●Yes ◯No [Submit] |
| /Book information/New-secondhand /Book/Price | Not created | ●Yes ◯No [Submit] |
| .. | .. | .. |
| /Book information/Magazine/Price, /Bookinformation/Used/Book/Price, /Book information/ New-secondhand/Book/Price | Not created | ◯Yes ●No [Submit] |
| .. | .. | .. |

Path appearance position management information 1160b

| Path condition | Appearance position | Appearance number |
|---|---|---|
| //Magazine | 1, 9 | 2 |
| //Used | 3 | 1 |
| //Price | 2, 5, 10 | 3 |
| : | : | : |
| //New-secondhand | 8 | 1 |
| //Magazine/Price | 2, 10 | 2 |
| //Book/Price | 5 | 1 |
| //Used/Book | 4 | 1 |
| //New-old/Magazine | 9 | 1 |
| //Used/Book/Price | 5 | 1 |
| //New-secondhand/Magazine/Price | 10 | 1 |

FIG. 26

Path appearance position management information 1160b

| Path condition | Appearance position | Appearance number | Structure appearance number among all registered documents |
|---|---|---|---|
| //Magazine | 1, 9 | 2 | 4 |
| //Used | 3 | 1 | 2 |
| //Price | 2, 5, 10 | 3 | 6 |
| ... | ... | ... | ... |
| //New-secondhand | 8 | 1 | 1 |
| //Magazine/Price | 2, 10 | 2 | 4 |
| //Book/Price | 5 | 1 | 1 |
| //Used/Book | 4 | 1 | 1 |
| //New-secondhand/Magazine | 9 | 1 | 1 |
| //Used/Book/Price | 5 | 1 | 2 |
| //New-secondhand/Magazine/Price | 10 | 1 | 1 |
| /Magazine/Price | 2 | 1 | 1 |
| /Used/Book/Price | 5 | 1 | 2 |
| /New-secondhand/Magazine/Price | 10 | 1 | 2 |

METHOD, SYSTEM AND PROGRAM FOR CREATING AN INDEX

CROSS REFERENCE TO RELATED APPLICATIONS

This application claims the benefit of Japanese Patent Application No. 2006-314008 filed on Nov. 21, 2006, the disclosure of which is incorporated herein by reference.

BACKGROUND OF THE INVENTION

1. Field of the Invention

The present invention relates to a method, a system and a program for creating an index so as to search a structured document satisfying a given condition in a structured document database in which a plurality of structured documents are stored.

2. Description of the Related Art

Structured documents having logical structures have been widely used in recent years. One representative example is a structured document described in XML (Extensible Markup Language). The structured documents are generally accumulated in a database constructed in a disk unit.

Herein an XML document is described as a representative example of the structured documents, and its terminology is defined. XML is a description language for an XML document. XML embeds a specified character string called a "tag" (for example, <Price> and </Price>) into its original text. The tag includes a start tag (for example, <Price>) and an end tag (for example, </Price>). The tag is composed of an element name and marks bracketing the element name. The start tag and the end tag are used in pairs. For example, the start tag "<Price>" and the end tag "</Price>" makes a pair, and their element name is "Price".

An XML document may have a hierarchical structure using tags.

An XML document has an element between a start tag and an end tag (for example, in "<Price>100</Price>", its element is "100"). Such an XML description makes it possible that an XML document by itself provides data and defines a meaning of the provided data.

In XML, an attribute can be added to a tag. The attribute is a pair composed of an attribute name and a value. For example, in "<Price unit="yen">100</Price>", the attribute name is "unit", and the value is "yen".

Besides the XML document, there are various structured documents having logical structures. For example, a representative structured document is an SGML (Standard Generalized Markup Language) document. SGML requires a document type definition (DTD), which is information concerning a logical structure such as an element name and a data type in the structured document. Meanwhile, XML does not always require the DTD.

Thus, a database for accumulating XML documents (hereinafter referred to as XML_DB) needs to be usable even without the DTD of a structured document to be accumulated.

Just as SQL is used as a syntax for representing a condition in searching a relational database, so is XPath (see http://www.w3.org/TR/xpath) or XQuery (see http://www.w3.org/TR/xquery) used as a syntax for representing a condition for a structure-specified search in an XML_DB. The W3C (World Wide Web Consortium) is working for standardization of such an XML-related technology.

To use a large number of structured documents accumulated in the XML_DB, there have been developed various structured document search systems for searching a document, an element, an element name, an attribute name, a value, or the like, which may match a search condition specified by a user, using the above-mentioned syntaxes such as XPath and XQuery. In the structured document search system for the XML_DB, generally an index based on an element name is generally created so as to conduct a fast search in which the element name is specified (hereinafter referred to as structure-specified search).

An index in a database is generally created in such a way that a database administrator specifies a target for which the index is created. However, if an XML_DB does not have any structural definition for describing a logical structure of an XML document to be accumulated, the database administrator cannot have any idea what type of the logical structure the XML document to be accumulated has.

In other words, it is difficult for the database administrator to specify in advance an element and a data type thereof for creating an index, because the database administrator has in advance no list of element names and data types corresponding thereto which the XML document to be accumulated in the XML_DB may include.

To deal with the above-mentioned problem, for example, Japanese Laid-Open Patent Application, Publication No. 2006-18584 discloses a method of determining a data type of an index to be created (hereinafter referred to as an full automatic indexing method). The full automatic indexing method creates indexes for element names and attribute names included in all XML documents which are accumulated in an XML_DB (hereinafter referred to as a structure index). As the indexes include all element names and attribute names in the logical structure index, the method can determine the data type of the created index for each element or value.

U.S. Pat. No. 6,105,022 discloses another method in which a database administrator does not need to specify the data type of an index. The method creates a full text search index by identifying element names and attribute names (hereinafter referred to as structure-specified full automatic search index method).

The full automatic indexing method disclosed in the former-cited Japanese Laid-Open Patent Application, Publication No. 2006-18584 creates logical structure indexes for element names and attribute names included in all accumulated XML documents. Hence, when the structure-specified search is conducted, in which a given element name can be specified, an index for the specified element name can be used in the full automatic indexing method, thus a response to the search is quick. For example, when the structure-specified search of "/Book information/Magazine/Price=100" is conducted, an index for "/Book information/Magazine/Price" can be used.

A condition for a structure in the structure-specified search does not always specify a single structure. For example, in XPath for describing a search condition in the structure-specified search in an XML_DB, a plurality of element names satisfying a given condition in all element names can be specified using a descendant axis. For example, if "//Price" is specified, not only "/Book information/Magazine/Price" but also "/Book information/Used/Magazine/Price" and "/Book information/New-secondhand/Magazine/Price" are specified collectively.

When the structure-specified search specifying a plurality of element names using the descendant axis in XPath (hereinafter referred to as the plural structure-specified search) is conducted, the full automatic indexing method conducts a search using a plurality of indexes present for each element name. Thus search results created for each index have to be merged, which makes a response to the search slow.

On the other hand, the structure-specified full text search index method disclosed in the U.S. Pat. No. 6,105,022 always uses one index for entire XML documents irrespective of a specified element name. Thus search results created for each index need not to be merged. Even when a search specifying plural structures is conducted, a response to the search is substantially the same as that of the structure-specified search, in which a given element name is specified.

However, the structure-specified full text search index method always uses a single index for entire XML documents irrespective of a specified element name. This means that data other than the specified element name are also subjected to processing. Since the response to the structure-specified search which specifies a given element name is slow, a response to the plural structure-specified search may also be slow.

Namely, there is a problem that, when the plural structure-specified search is conducted, a response to the search is not so quick, if the search is conducted using an index created by the full automatic indexing method or the structure-specified full text search index method.

To solve the above-mentioned problem, in a simple manner, a search method is contemplated in which a plurality of indexes with which merge processing of search results would be otherwise necessary are packaged into a single index (hereinafter referred to as a packaged index) in advance, and a search is conducted using the single packaged index. To obtain the plurality of yet-to-be-packaged indexes, a methodology of creating element name-by-element name indexes for all element names is used based on a concept of the full automatic indexing method.

However, if the element name-by-element name indexes are created for all element names, in other words, if the indexes are created for a combination of all logical structures, the number of the created indexes is enormous. This results in an enormous quantity of information to be managed as indexes, and an enormous amount of time to register structured documents and update the indexes.

It is thus an object of the present invention to provide a method for extracting a minimum necessary packaged index for use in conducting the plural structure-specified search for a structured document having a document data-structure.

SUMMARY OF THE INVENTION

An aspect of the present invention is a method for creating an index for searching a structured document having a document data-structure stored, in a computer. The method to be performed in the computer for creating an index includes the steps of: analyzing the structured document to extract a document data-structure in the structured document; normalizing the extracted document data-structure to create a logical structure index composed of a plurality of elements having a hierarchical structure; extracting an appearance number of each element in the created logical structure index; and extracting elements for which an index is to be created, based on the logical structure index, by comparing the appearance number of the extracted element and a first predetermined threshold.

Other features and advantages of the present invention will become more apparent from the following detailed description of the invention, when taken in conjunction with the accompanying exemplary drawings.

BRIEF DESCRIPTION OF THE DRAWINGS

FIG. 3 is an example of a structured document described in XML format.

FIG. 4 is another example of a structured document described in XML format.

FIG. 13 is a view showing an example of path appearance position management information.

FIG. 15 is a view showing an example of value index definition management information.

FIG. 20 is a view showing an example of a screen for a value index creation confirmation according to the second embodiment.

FIG. 23 is a view showing an example of path appearance position management information according to the third embodiment.

FIG. 26 is a view showing an example of path appearance position management information according to the fourth embodiment.

DETAILED DESCRIPTION OF PREFERRED EMBODIMENTS

First Embodiment

In a first embodiment of the present invention, a system for creating an index, capable of enhancing a response performance for a plural structure-specified search by using a minimum necessary packaged index created for a structured document composed of a plurality of element names is described.

The system for creating an index according to the present embodiment creates a packaged index for a plurality of path names in a structured document. A plurality of path names having the same element name at their end ("terminal element") irrespective of the different hierarchical positions of the elements may be in the structured document, and some of such path names the number of which in the structured document is large are merged into a packaged index. One example is an element name "Price" as shown in the XML document in FIG. 3 and FIG. 4 to be hereinafter described. The element name "Price" corresponds to three kinds of four path names in the hierarchical structure. That is, a path name "/Book information/Magazine/Price", a path name "/Book information/Used/Book/Price", and two path names "/Book information/New-secondhand/Magazine/Price" have the same terminal element though not every element "Price" is on the same layer of their hierarchical structure.

<System for Creating an Index>

Figure 1:
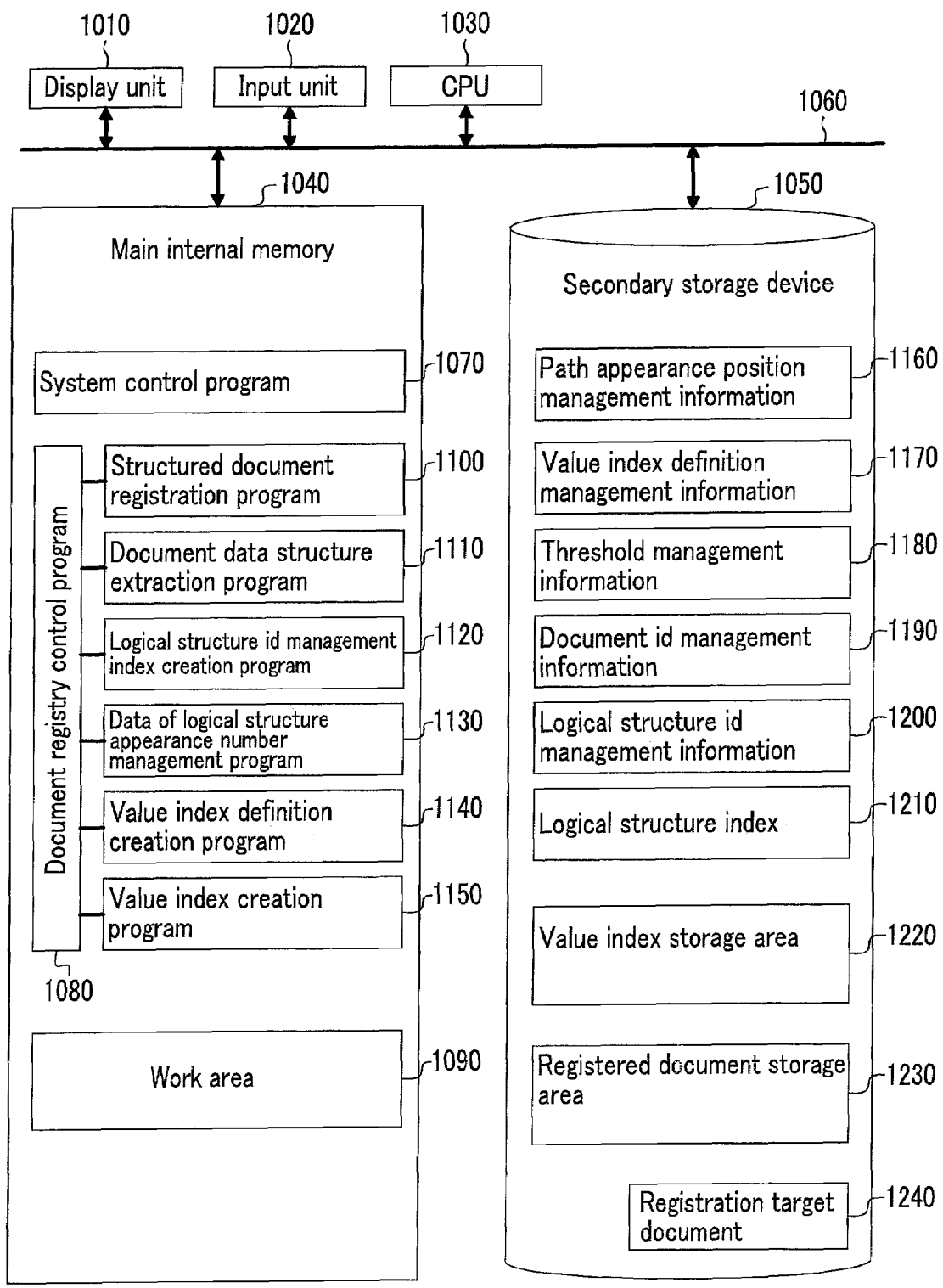
FIG. 1 is a schematic configuration view showing a system for creating an index according to a first embodiment.

FIG. 1 is a schematic configuration view showing a system for creating an index according to the first embodiment. As shown in FIG. 1, the system for creating an index according to the first embodiment includes: a display unit 1010 for displaying results of processing; an input unit 1020 embodied by an interface of a removable medium in which a registration target document is stored, and a keyboard and/or a mouse through which an instruction of registration processing is inputted; a CPU (Central Processing Unit) 1030 for executing programs hereinafter described; a main internal memory 1040 embodied by a RAM (Random Access Memory) or the like; and a secondary storage device 1050 embodied by a hard disk drive or the like, which are connected via a bus 1060. The system for creating an index is embodied by a generally-used computer.

The main internal memory 1040 in the system for creating an index has a space allocated to a system control program 1070 for controlling the entire system for creating an index, and a document registry control program 1080 for executing structured document registration processing which are deployed therein; and to a work area 1090 as a temporary storage area which is used by each program.

The document registry control program 1080 calls up each of the following programs as a subroutine according to the necessity: a structured document registration program 1100, a document data-structure extraction program 1110, a logical structure id management index creation program 1120, a data of logical structure appearance number management program 1130, a value index definition creation program 1140, and a value index creation program 1150, which are deployed in the main internal memory 1040.

In the embodiment, the logical structure index herein means information indicating a relation between each structure described with XPath or the like and the corresponding index for each structure, details of which are described later. The value index herein means a set of indexes generally used in a database such as a B-tree and an n-gram for each structure.

An outline of each program called up by the document registry control program 1080 is described next.

The structured document registration program 1100 obtains a target structured document; assigns a document id to the structured document; and stores the structured document with the document id.

The document data-structure extraction program 1110 receives the registration target structured document; performs matching of a given character string from the beginning of the inputted document text data to determine whether or not the given character string is present (hereinafter referred to as text-scanning); analyzes a logical structure of the structured document by detecting a tag; and creates a structural analysis tree of the structured document.

The logical structure id management index creation program 1120 receives and normalizes data of the structural analysis tree; puts all branches having the same hierarchical structure into one; if a structure index already exists, adds to the logical structure index, a branch which is present in the normalized structural analysis tree but is not present in the logical structure index; and, if a logical structure index does not exist, stores the normalized structural analysis tree as a structure index.

The data of logical structure appearance number management program 1130 obtains an element corresponding to a path in the logical structure index; stores the element as an appearance position, which is performed for each path; and stores a total number of the appearance positions as an appearance number.

The value index definition creation program 1140 compares the appearance number and a threshold; and, if a path having an appearance number larger than the threshold is detected, stores the path as a packaged index definition, for packaging all element names of the path.

The value index creation program 1150 creates a packaged index based on the packaged index definition.

The programs described above deployed in the main internal memory 1040 so as to make the computer function as the system for creating an index are stored in a storage medium such as a CD-ROM. The programs are installed in the secondary storage device 1050 such as a hard disk drive, and are deployed in the main internal memory 1040, and are executed.

As the storage medium for storing the programs, not only the CD-ROM but also a removable medium such as a flash memory may be used. The programs may be transmitted from an external server not shown via a network, deployed in the main internal memory 1040, and executed.

The secondary storage device 1050 has path appearance position management information 1160, value index definition management information 1170, threshold management information 1180, document id management information 1190, logical structure id management information 1200, and a logical structure index 1210.

The secondary storage device 1050 also has a storage space allocated to a value index storage area 1220, a registered document storage area 1230, and an area for storing registration target documents 1240.

The storage areas described above are created in the secondary storage device 1050 in the embodiment. However, the storage areas may be created in the main internal memory 1040 or an external storage device. Each information stored in the secondary storage device 1050 will be described later in detail. A configuration is also applicable in which a display screen for inputting and referencing a threshold is provided, and a database administrator inputs a predetermined threshold on the display screen.

<Processing in the System for Creating an Index>

Processing executed in the system for creating an index having the above-mentioned configuration is described next.

When the system for creating an index is started, the system control program 1070 is loaded from the secondary storage device 1050 into the main internal memory 1040. Subsequently, the system control program 1070 receives the registration target documents 1240 from the input unit 1020, and stores the registration target documents 1240 in a predetermined area of the secondary storage device 1050.

When the system control program 1070 receives a processing start instruction inputted from the input unit 1020, the system control program 1070 loads the document registry control program 1080 from the secondary storage device 1050 into the main internal memory 1040 to run the document registry control program 1080, and starts structured document registration processing.

Figure 2:
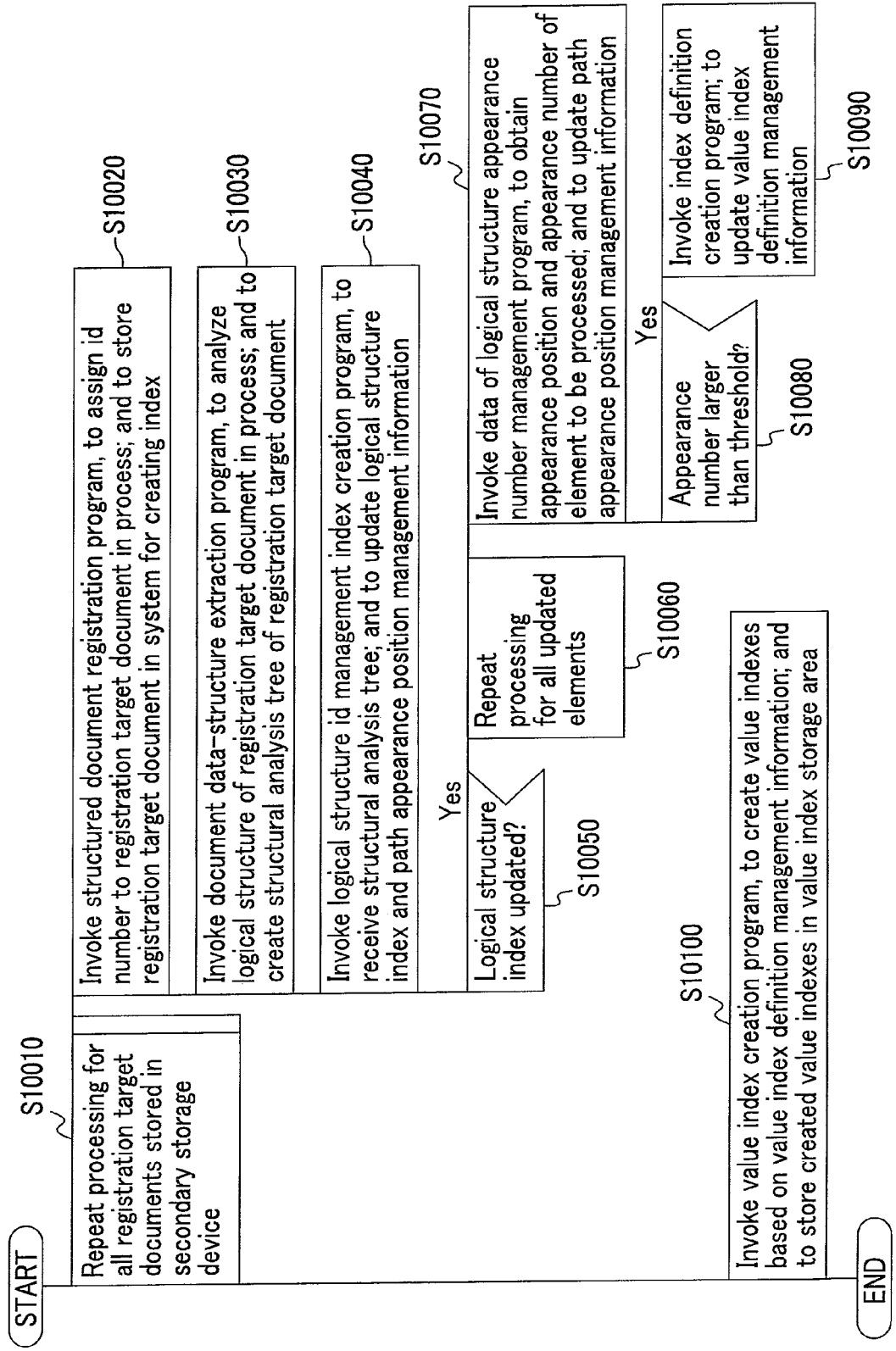
FIG. 2 is a problem analysis diagram (PAD) showing processing of a document registry control program.

FIG. 2 is a PAD (Problem Analysis Diagram) showing the structured document registration processing to be executed by the document registry control program 1080. Procedures of the structured document registration processing are described below with reference to FIG. 2, and FIG. 1 according to the necessity.

The document registry control program 1080 repeats a series of registration target document storage processing as shown in step S10020 through step S10090 for all the registration target documents 1240 stored in the secondary storage device 1050 (step S10010).

The registration target document storage processing is described next.

The document registry control program 1080 invokes the structured document registration program 1100, which assigns an identification number to a registration target document in process, and stores the registration target document in the system for creating an index (step S10020). Detailed contents of the processing executed by the structured document registration program 1100 will be described later (see FIG. 5).

Figure 6:
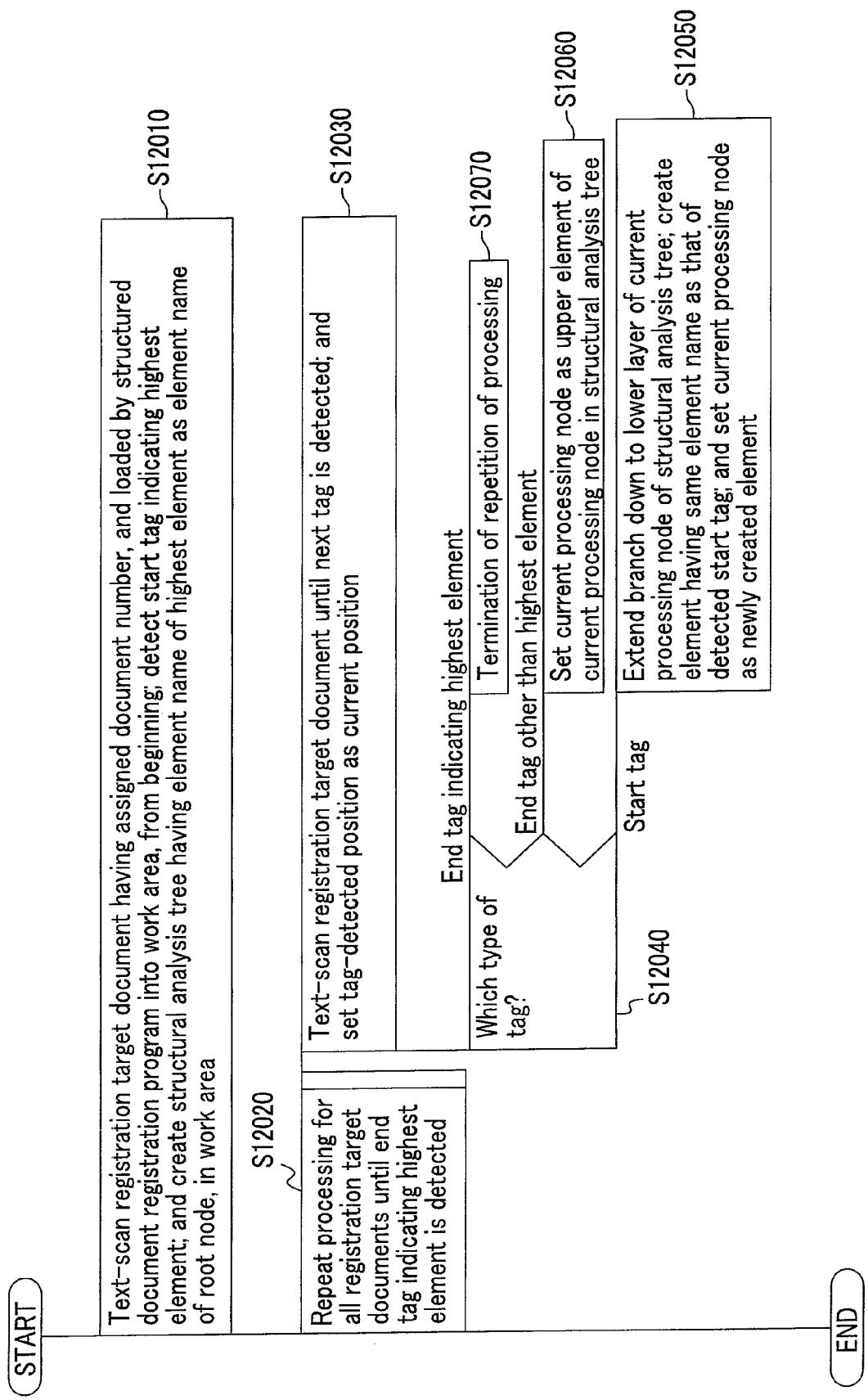
FIG. 6 is a PAD showing processing of a document data-structure extraction program.

The document registry control program 1080 invokes the document data-structure extraction program 1110, which analyzes a logical structure of the registration target document 1240 in process, and creates a structural analysis tree of the registration target document in process (step S10030). Detailed contents of the processing executed by the document data-structure extraction program 1110 will be described later (see FIG. 6).

Figure 9:
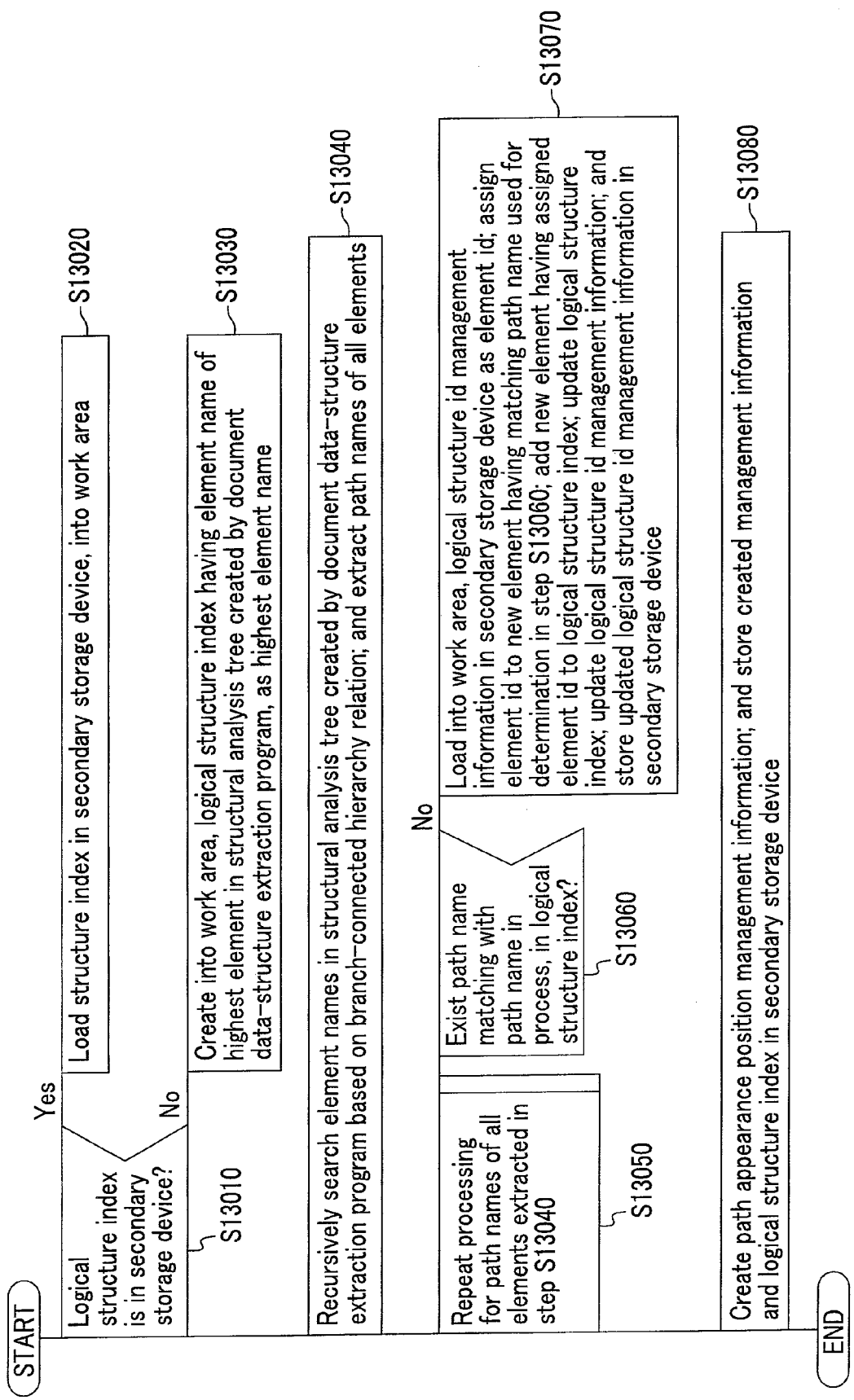
FIG. 9 is a PAD showing processing of a structure index creation program.

The document registry control program 1080 invokes the logical structure id management index creation program 1120, which receives the structural analysis tree; and updates the logical structure index 1210 and the path appearance position management information 1160 (step S10040). Detailed contents of the processing executed by the logical structure id management index creation program 1120 will be described later (see FIG. 9). Details of the logical structure index 1210 and path appearance position management information 1160 will also be described later.

The document registry control program 1080 determines whether or not the logical structure index 1210 is updated in step S10040 (step S10050). If the logical structure index 1210 is updated ('Yes' in step S10050), the document registry control program 1080 repeats a series of value index definition creation processing as shown in step S10070 through step S10090 for all elements in the logical structure index 1210 updated in step S10040 (step S10060). Next is described processing in step S10070 through step S10090.

The document registry control program 1080 invokes the data of logical structure appearance number management program 1130, which obtains an appearance position and an appearance number of an element to be processed, and updates the path appearance position (step S10070). Detailed contents of the processing executed by the data of logical structure appearance number management program 1130 will be described later (see FIG. 12).

Figure 14:
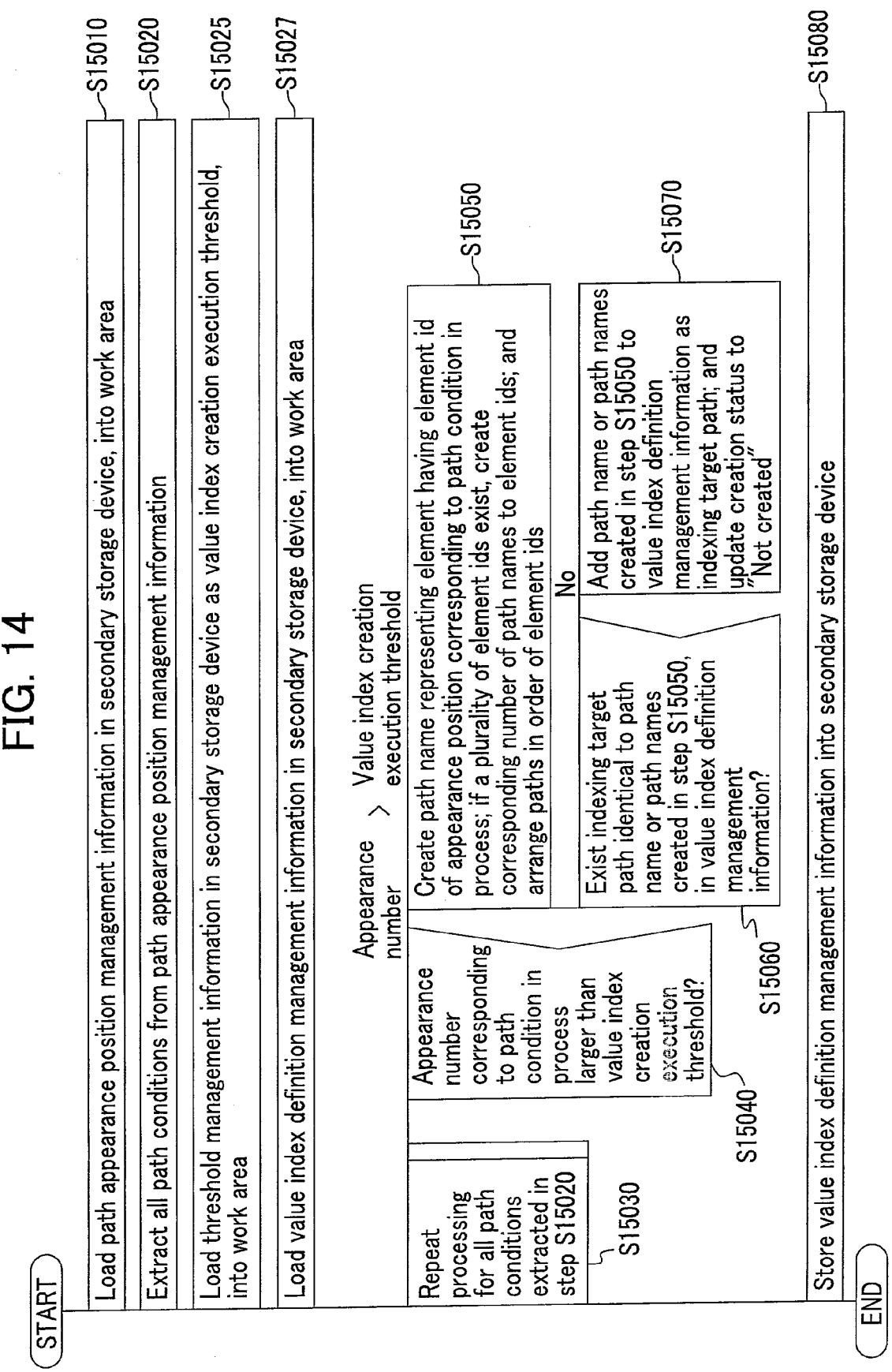
FIG. 14 is a PAD showing processing of a value index definition creation program.

The document registry control program 1080 determines whether or not the appearance number of the element to be processed obtained in step S10070 is larger than a predetermined threshold stored in the threshold management information 1180 (step S10080). If the appearance number is larger than the threshold ('Yes' in step S10080), the document registry control program 1080 evokes the value index definition creation program 1140, which updates the value index definition management information 1170 (step S10090). Detailed contents of the processing executed by the value index definition creation program 1140 and details of the value index definition management information 1170 will be described later (see FIG. 14).

When the structured document registration processing into the system for creating an index is completed for all the registration target documents 1240 in step S10010, the document registry control program 1080 invokes the value index creation program 1150, which creates value indexes based on the value index definition management information 1170, and stores the value indexes in the value index storage area 1220 (step S10100), thus terminating the structure registration processing. Detailed contents of the processing executed by the value index creation program 1150 will be described later (see FIG. 16).

Next are described detailed contents of the processing executed by the above-mentioned programs, which are provided in each step of the document registry control program 1080 shown in FIG. 2.

<Structured Document Registration Program>

The structured document registration program 1100, which is evoked by the document registry control program 1080, executes structured document storage processing, in which one of the registration target documents 1240 stored in the secondary storage device 1050 is specified as a processing target structured document, and a specified processing target structured document is stored in the registered document storage area 1230.

Examples of specified processing target structured documents are described with reference to FIG. 3 and FIG. 4.

A processing target structured document has a logical structure. A tag hierarchically inserted into the structured document represents the logical structure. In the structured documents in XML format shown in FIG. 3 and FIG. 4, a name of the highest element in the logical structure is "Book information". In the XML document shown in FIG. 3, the element name "Book information" 2010 has in its lower layer, three element names such as "Magazine" 2020, "Used" 2030, and "New-secondhand" 2040. The element name "Magazine" 2020 has in its lower layer the element name "Price" 2050, and its element is "Y560". The element name "New-secondhand" 2040 has in its lower layer the element name "Magazine" 2060, and the element name "Magazine" 2060 further has in its lower layer two element names such as "Price" 2070 (its element is "Y360") and "Price" 2080 (its element is "Y390").

Meanwhile, the XML document shown in FIG. 4 has the element name "Book information" 7010, and in its lower layer, two element names "Magazine" 7020 and "Used" 7030. The element name "Magazine" 7020 has in its lower layer the element name "Price" 7040 (its element is Y780). In the XML document shown in FIG. 4, the element name "Book information" 7010 does not have in its layer the element name "New-secondhand".

Figure 5:
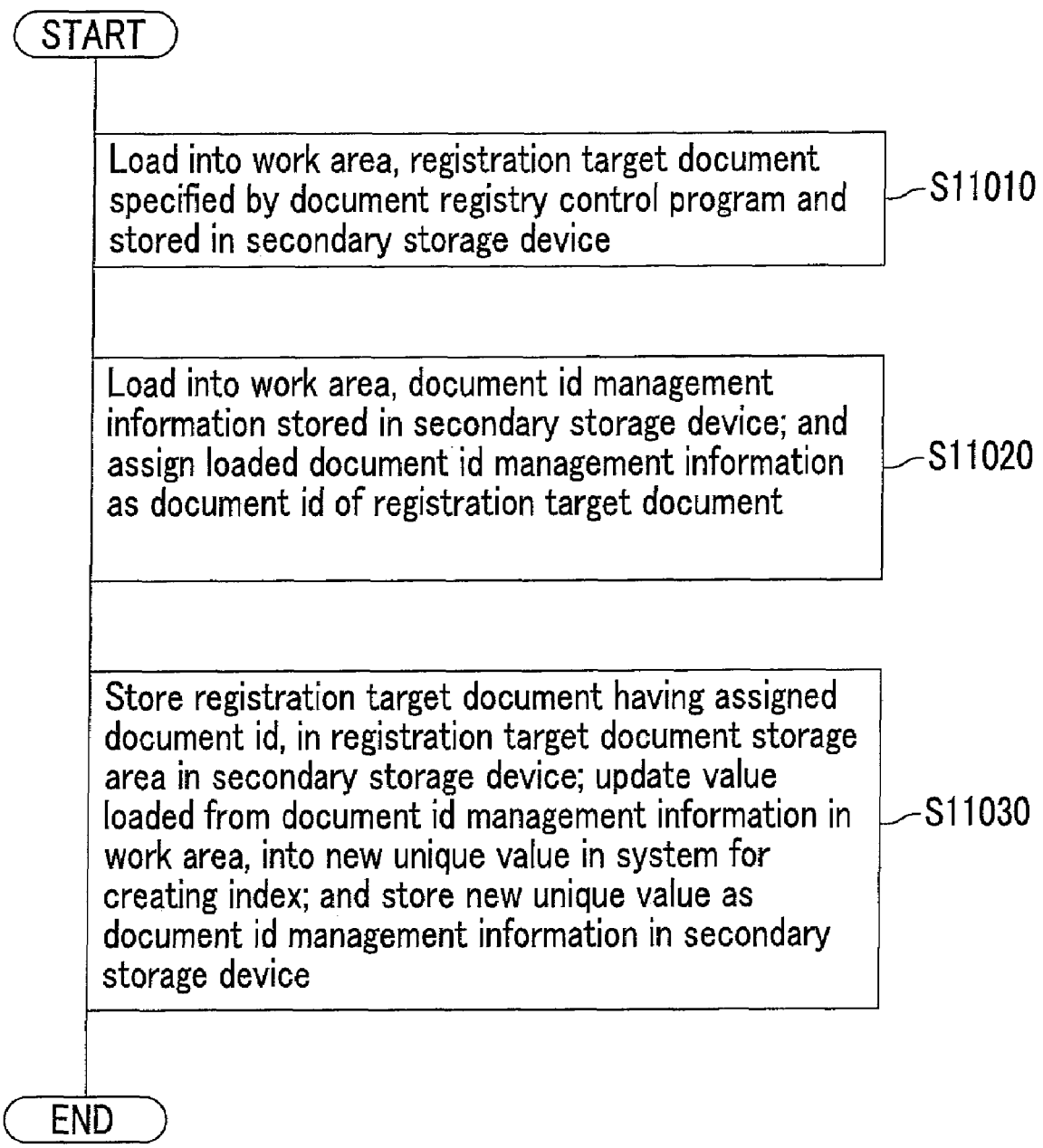
FIG. 5 is a PAD showing processing of a structured document registration program.

Next is described the structured document storage execution processing to be executed by the structured document registration program 1100 with reference to FIG. 5 (see also FIG. 1 according to the necessity).

The structured document registration program 1100 loads the registration target documents 1240 (for example, the XML documents shown in FIG. 3) specified by the document registry control program 1080 and stored in the secondary storage device 1050, into the work area 1090 (step S11010).

The structured document registration program 1100 loads the document id management information 1190 stored in the secondary storage device 1050, into the work area 1090, and associates the document id management information 1190 as a document id with the registration target document 1240 in process (step S11020).

Herein, the document id management information 1190 is a unique value (for example, an integral number) in the system for creating an index. After this, the read unique value is used as the document id assigned to the registration target document 1240 in process.

The structured document registration program 1100 stores the registration target document 1240 in process, to which the document id has been assigned in step S11020, in the registered document storage area 1230 in secondary storage device 1050. The structured document registration program 1100 updates the value loaded from the document id management information 1190 in the work area 1090, into a new unique value in the system for creating an index. The structured document registration program 1100 stores the new unique value as the document id management information 1190 in the secondary storage device 1050 (step S11030), thus terminating the structured document storage execution processing.

An example of the new unique value is, if its original value is an integral number, the original number plus one. It is to be noted that, when there are a plurality of the registration target documents 1240, the structured document storage processing is executed for each of the registration target documents 1240.

<Document Data-structure Extraction Program>

The document data-structure extraction program 1110 is invoked by the document registry control program 1080, and executes logical structure analysis processing for the registration target documents 1240. The logical structure analysis processing to be executed by the document data-structure extraction program 1110 is described with reference to FIG. 6 (see also FIG. 1 according to the necessity).

The document data-structure extraction program 1110 text-scans the registration target document 1240, to which the document id loaded into the work area 1090 by the structured document registration program 1100 has been assigned, from the beginning; detects a start tag indicating the highest element in the registration target document 1240; and creates in the work area 1090 a structural analysis tree in which an element name of the highest element detected is assigned to be the element name of a root node (step S12010).

Herein, the root node of the structural analysis tree is a current processing node. A position of the start tag indicating the highest element in the registration target document 1240 is a current position for text-scanning.

Figure 7:
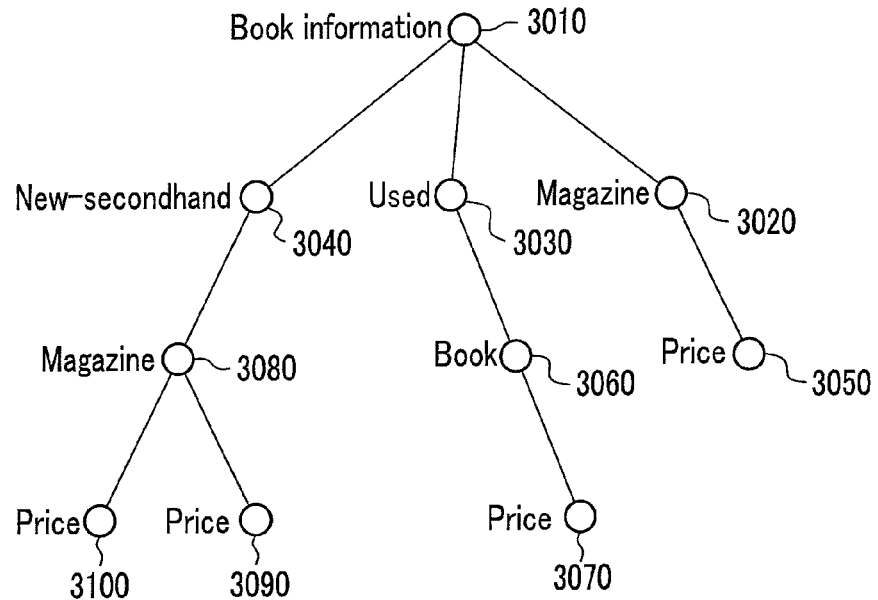
FIG. 7 is a view showing a structural analysis tree created from the structured document in FIG. 3.
Figure 8:
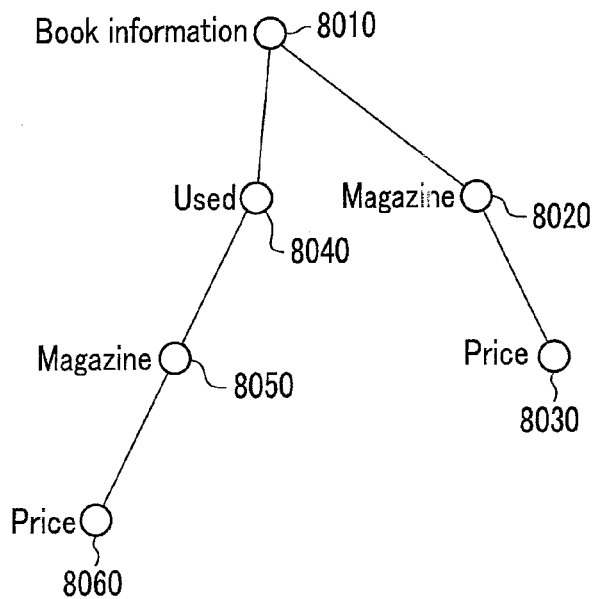
FIG. 8 is a view showing a structural analysis tree created from the structured document in FIG. 4.

Next is described a structural analysis tree with reference to FIG. 7 showing a structural analysis tree created from the XML document shown in FIG. 3, and to FIG. 8 showing a structural analysis tree created from the XML document shown in FIG. 4. As shown in FIG. 7 and FIG. 8, each of the structural analysis trees is composed of elements represented by open circles and branches represented by straight lines.

In the structural analysis tree in FIG. 7, the highest element has the element name "Book information" 3010. A notation representing a logical structure with a combination of an element name(s) and a slash(es), such as "/Book information" is referred to as a path name. The leftmost slash of the path name indicates that an element name on the right side of the slash is the element name of a root node. A slash(es) other than the leftmost slash indicates that an element having its element name on the right side of the slash is present in a lower layer of an element having its element name on the right side of the slash.

FIG. 7 shows that the element names "Magazine" 3020, "Used" 3030, and "New-secondhand" 3040, each of which branches out of a path name "/Book information/Used" 3030, are substructures of the path name "/Book information". Another notation using path names describes the path name "/Book information/Magazine" 3020, the path name "/Book information/Used" 3030, and the path name "/Book information/New-secondhand" 3040, respectively.

The structural analysis tree in FIG. 7 further has the path name "/Book information/Magazine/Price" 3050, the path name "/Book information/Used/Book" 3060, the path name "/Book information/Used/Book/Price" 3070, the path name "/Book information/New-secondhand/Magazine" 3080, the path name "/Book information/New-secondhand/Magazine/Price" 3090, and the path name "/Book information/New-secondhand/Magazine/Price" 3100.

As described above, FIG. 8 shows the structural analysis tree created from the XML document shown in FIG. 4. In the structural analysis tree in FIG. 8, the highest element has the element name "Book information" 8010.

Further, the structural analysis tree in FIG. 8 has the path name "/Book information/Magazine" 8020, the path name "/Book information/Magazine/Price" 8030, the path name "/Book information/Used" 8040, the path name "/Book information/Used/Magazine" 8050, and the path name "/Book information/Used/Magazine/Price" 8060.

Returning to FIG. 6, the document data-structure extraction program 1110 repeats a set of tag detection processing in step S12030 through step S12070, until an end tag indicating the end of the highest element in the registration target document is detected (step S12020).

Next is described the tag detection processing in step S12030 through step S12070.

The document data-structure extraction program 1110 text-scans the registration target document 1240, until a next tag is detected. When the next tag is detected, the document data-structure extraction program 1110 sets a position where the tag is detected as a current position (step S12030). The document data-structure extraction program 1110 then determines a type of the tag detected in step S12030 (step S12040).

If the detected tag is a start tag, the document data-structure extraction program 1110 extends a branch down to a lower layer of a current processing node of the structural analysis tree; creates an element having the same element name as that of the detected start tag; and sets the current processing node as the newly created element (step S12050).

If the detected tag is an end tag other than that of the highest element, the document data-structure extraction program 1110 sets the current processing node as an upper element of the current processing node of the structural analysis tree (step S12060).

If the detected tag is the highest end tag, the document data-structure extraction program 1110 terminates the tag detection processing (step S12070). The creation of the structural analysis tree is completed, thus terminating the logical structure analysis processing of the document data-structure extraction program 1110.

<Logical Structure id Management Index Creation Program>

The logical structure id management index creation program 1120 is invoked by the document registry control program 1080, and executes logical structure index creation processing. The logical structure index creation processing to be executed by the logical structure id management index creation program 1120 is described with reference to FIG. 9 (see FIG. 1 according to the necessity).

The logical structure id management index creation program 1120 determines whether or not the logical structure index 1210 already exists in the secondary storage device 1050 (step S13010).

If the logical structure index 1210 already exists in the secondary storage device 1050, the logical structure id management index creation program 1120 loads the logical structure index 1210 in the secondary storage device 1050, into the work area 1090 (step S13020).

If the logical structure index 1210 does not exist in the secondary storage device 1050, the document data-structure extraction program 1110 creates into the work area 1090, a new logical structure index 1210 in which an element name of the highest element is set as an element name of the highest element (step S13030).

The logical structure id management index creation program 1120 recursively searches element names in the structural analysis tree created by the document data-structure extraction program 1110, based on a branch-connected hierarchy relation, and extracts path names of all the elements (step S13040).

The logical structure id management index creation program 1120 repeats processing in S13060 through S13070 for the path names of all the elements extracted in step S13040 (S13050). Next is described logical structure index updating processing.

The logical structure id management index creation program 1120 determines whether or not a path name matching with a path name in process exists in the logical structure index 1210 (step S13060). If such a path name does not exist in the logical structure index 1210, the logical structure id management index creation program 1120 loads the logical structure id management information 1200 in the secondary storage device 1050 as an element id, into the work area 1090; adds a new element matching with the path name used for determination in step S13060 to the logical structure index 1210, after the element id is assigned to the new element; thus updates the logical structure index 1210; also updates the logical structure id management information 1200; and stores the updated logical structure id management information 1200 in the secondary storage device 1050 (step S13070).

It is to be noted that the logical structure id management information 1200 takes a unique value in the system for creating an index.

Figure 10:
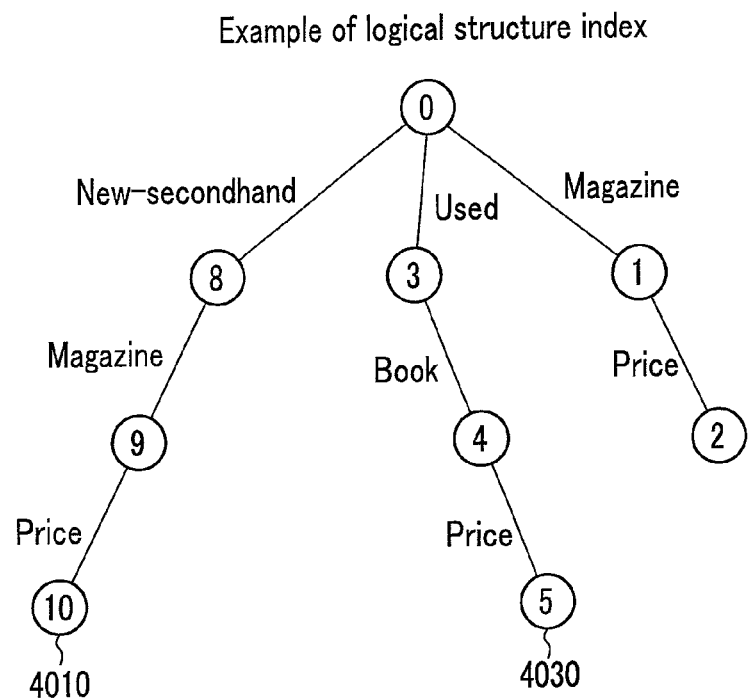
FIG. 10 is a view showing a logical structure index created from the structural analysis tree in FIG. 7.

When the logical structure index update processing is completed for the path names of all the elements, the logical structure id management index creation program 1120 creates the path appearance position management information 1160 to be described later, based on the logical structure index 1210; and stores the created path appearance position management information 1160 and the logical structure index 1210 in the secondary storage device 1050 (step S13080), thus terminating the logical structure index creation processing. Next is described a logical structure index with reference to FIG. 10. FIG. 10 shows the logical structure index created from the structural analysis tree in FIG. 7 by the processing in step S13050 through step S13070.

The structural analysis tree in FIG. 7 is normalized by a path name, so that the elements having the path name "/Book information/New-secondhand/Magazine/Price" are packaged into one element 4010 as shown in FIG. 10.

Figure 11:
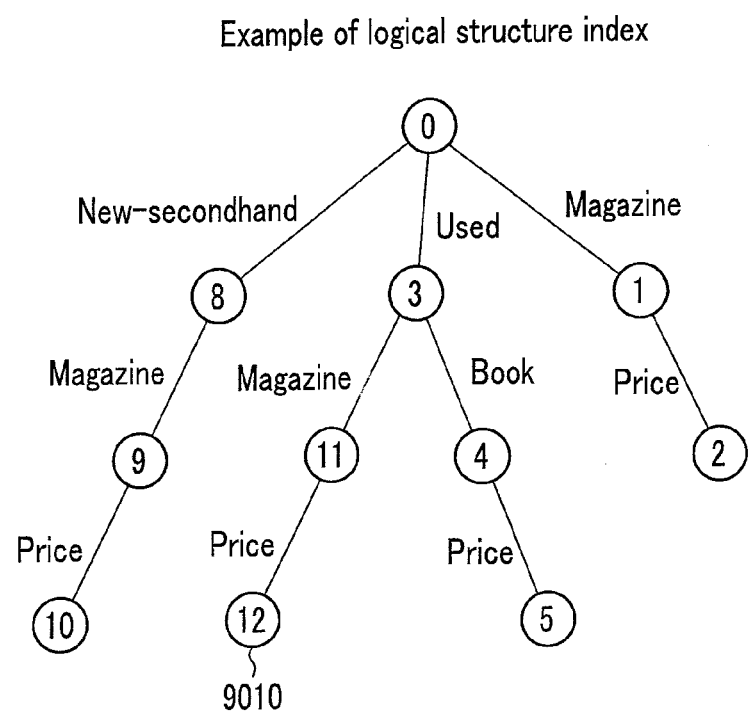
FIG. 11 is a view showing a logical structure index updated based on the logical structure index in FIG. 10, with additional information on the structural analysis tree in FIG. 8.

Then the logical structure index shown in FIG. 10 is read and updated with the structural analysis tree shown in FIG. 8, to thereby make a logical structure index shown in FIG. 11. As compared to the logical structure index shown in FIG. 10, a new element 9010 having the path name "/Book information/Used/Magazine/Price" is added to the updated logical structure index shown in FIG. 11.

<Data of Logical Structure Appearance Number Management Program>

The data of logical structure appearance number management program 1130 is invoked by the document registry control program 1080, and executes data of logical structure appearance number management processing. The data of logical structure appearance number management processing to be executed by the data of logical structure appearance number management program 1130 is described with reference to FIG. 12 (see FIG. 1 according to the necessity).

The data of logical structure appearance number management program 1130 loads the logical structure index 1210 in the secondary storage device 1050, into the work area 1090 (step S14010).

The data of logical structure appearance number management program 1130 extracts all terminal element names from the read structure index 1210 (step S14012). The terminal element name used herein means an element name of an element which does not have any element in its lower layer among all elements included in the logical structure index 1210.

Then the data of logical structure appearance number management program 1130 loads the path appearance position management information 1160 in the secondary storage device 1050, into the work area 1090 (step S14015).

FIG. 13 is a table showing the path appearance position management information 1160, which is created in the same creation processing as that executed when the logical structure index shown in FIG. 10 is created. Next is described the path appearance position management information 1160 with reference to FIG. 13 (see FIG. 10 according to the necessity).

In FIG. 13, a path condition 5010 is expressed in XPath notation. For example, the path condition "//Price" represents an element whose descendant element has its element name of "Price". In the logical structure index shown in FIG. 10, elements which satisfy the path condition are the path name "/Book information/Magazine/Price" 4020, the path name "/Book information/Used/Book/Price" 4030, and the path name "/Book information/New-secondhand/Magazine/Price" 4010. Therefore, as shown in FIG. 13, an appearance position 5020 for "//Price" describes "2, 5, 10", which indicates element ids of the respective elements.

In a column of an appearance number 5030, the numbers of elements in the logical structure index satisfying each path condition 5010 are described. The appearance number 5030 for the path condition "//Price" is "3".

The data of logical structure appearance number management program 1130 repeats terminal element addition processing in step S14030 through step S14050 for all the terminal element names extracted in step S14012 (step S14020) Next is described the terminal element addition processing.

The data of logical structure appearance number management program 1130 creates a path condition which is satisfied by all paths having the same terminal element name as a terminal element name in process (step S14030).

The data of logical structure appearance number management program 1130 determines whether or not a record having the same path condition as the path condition 5010 created in step S14030 exists in the path appearance position management information 1160 in the secondary storage device 1050 (step S14040). If the same path condition does not exist in the path appearance position management information 1160, the path condition created in step S14030 is added to the path appearance position management information 1160 as a new path condition (step S14050).

When the terminal element addition processing is completed for all terminal element names, the data of logical structure appearance number management program 1130 extracts all path conditions 5010 from the path appearance position management information 1160 (step S14060).

The data of logical structure appearance number management program 1130 repeats element appearance number update processing in step S14080 to be hereinafter described, for all the path conditions 5010 extracted in step S14060 (step S14070).

In the element appearance number update processing in step S14080, the data of logical structure appearance number management program 1130 extracts of an element id of an element satisfying the path condition 5010 in process from the logical structure index 1210 in the secondary storage device 1050; stores the element id into the path appearance position management information 1160 as the appearance position 5020 corresponding to the path condition 5010 in process; and stores the number of the elements satisfying the path condition 5010 in process in the path appearance position management information 1160 into the path appearance position management information 1160 as the appearance number 5030.

The data of logical structure appearance number management program 1130 then stores the path appearance position management information 1160 into the secondary storage device 1050 (step S14090), thus terminating the element id appearance number update processing.

<Value Index Definition Creation Program>

The value index definition creation program 1140 is invoked by the document registry control program 1080, and executes value index definition creation processing. The value index definition creation processing to be executed by the value index definition creation program 1140 is described with reference to FIG. 14 (see FIG. 1 according to the necessity).

The value index definition creation program 1140 loads the path appearance position management information 1160 (see FIG. 13) in the secondary storage device 1050, into the work area 1090 (step S15010). The value index definition creation program 1140 then extracts all path conditions 5010 from the path appearance position management information 1160 (step S15020).

The value index definition creation program 1140 loads the threshold management information 1180 in the secondary storage device 1050, into the work area 1090 as a value index creation execution threshold (step S15025). The value index definition creation program 1140 also loads the value index definition management information 1170 in the secondary storage device 1050, into the work area 1090 (step S15027).

FIG. 15 is a table showing the value index definition management information 1170. Next is described the value index definition management information 1170 with reference to FIG. 15.

In the value index definition management information 1170 in FIG. 15, an indexing target path 6010 represents a path name of one or more elements which are targets of indexing when a packaged index is created.

A creation status 6020 represents whether a status of a packaged index corresponding to a current creation status is "Created" or not in the system for creating an index.

The present embodiment assumes the full automatic indexing method. Hence, any index which has the indexing target path 6010 composed of a single path name is created in the embodiment.

The value index definition creation program 1140 then repeats value index creation determination processing in step S15040 through step S15070 for all the path conditions 5010 extracted in step S15020 (step S15030). Next is described the value index creation determination processing.

The value index definition creation program 1140 compares the appearance number 5030 corresponding to the path condition 5010 in process to a value index creation execution threshold, and determines whether or not the appearance number 5030 is larger than the value index creation threshold (step S15040). If the appearance number 5030 is larger than the value index creation threshold, the value index definition creation program 1140 creates a path name representing an element having an element id of the appearance position 5020 corresponding to the path condition 5010 in process. If there are a plurality of element ids, the value index definition creation program 1140 creates a corresponding number of path names (step S15050). The path names are arranged in an order of element ids assigned to the elements corresponding to the path names.

The value index definition creation program 1140 determines whether or not the indexing target path 6010 identical to the path name or the path names created in step S15050 exists in the value index definition management information 1170 (step S15060). If the indexing target path 6010 does not exist, the value index definition creation program 1140 adds the path name or the set of path names created in step S15050 to the value index definition management information 1170 as the indexing target path 6010, and updates the creation status 6020 to "Not created" (step S15070).

In step S15060, whether or not the indexing target path 6010 not identical but partly identical to the path name or the path names created in step S15050 exists in the value index definition management information 1170 may be determined. In this case, if the indexing target path 6010 partly identical to the path name or the path names exists therein, the value index definition creation program 1140 updates the indexing target path 6010 with the path name or the set of path names created in step S15050.

When the value index creation processing is completed for all the path conditions 5010, the value index definition creation program 1140 stores the value index definition management information 1170 into the secondary storage device 1050 (step S15080), thus terminating the value index definition creation processing.

<Value Index Creation Program>

The value index creation program 1150 is invoked by the document registry control program 1080, and executes value index creation control processing. The value index creation control processing of the value index creation program 1150 is described with reference to FIG. 16 (see FIG. 1 and FIG. 15 according to the necessity).

The value index creation program 1150 loads the value index definition management information 1170 in the secondary storage device 1050, into the work area 1090 (step S16010). The value index creation program 1150 then extracts all the indexing target paths 6010 from the value index definition management information 1170 in the work area 1090 (step S16020).

The value index creation program 1150 repeats value index creation execution processing for all the indexing target paths 6010 extracted in step S16020 (step S16030). Next is described the value index creation execution processing.

The value index creation program 1150 creates indexes for all the path values specified by the indexing target path 6010 in process, and stores the created indexes in the value index storage area 1220 in the secondary storage device 1050 (step S16040). The value index creation program 1150 updates the creation status 6020 of the value index definition management information 1170 corresponding to the indexing target path 6010 in process to "Created" (step S16050).

When the value index creation execution processing is completed for all the indexing target paths 6010, the value index creation program 1150 stores the value index definition management information 1170 in the secondary storage device 1050 (step S16060), thus terminating the value index creation control processing.

As described above, the document registry control program 1080 executes the structured document registration processing by calling up, according to the necessity, the structured document registration program 1100, the document data-structure extraction program 1110, the logical structure id management index creation program 1120, the data of logical structure appearance number management program 1130, the value index definition creation program 1140, and the value index creation program 1150.

The structured document registration processing in the embodiment is effective, when there are a plurality of elements which satisfy a plural structure-specified condition. For example, it is effective when there are a plurality of elements which satisfy the path condition "///Price", such as elements of the path name "/Book information/Magazine/Price", of the path name "/Book information/Used/Book/Price", of the path name "/Book information/Used/Magazine/Price", and of the path name "/Book information/New-secondhand/Magazine/Price".

In this case, if element-by-element indexes are only available, it is necessary to conduct searches with four indexes, namely, the index of the path name "/Book information/Magazine/Price", of the path name "/Book information/Used/Book/Price", of the path name "/Book information/Used/Magazine/Price", and of the path name "/Book information/New-secondhand/Magazine/Price", and to merge the search results. This means that four searches and three merges are necessary in the case.

On the other hand, if the search is conducted using an index (a packaged index) which packages the elements of the path name "/Book information/Used/Book/Price", of the path name "/Book information/Used/Magazine/Price", and of the path name "/Book information/New-secondhand/Magazine/Price", for the path condition "/Price", merging of search results is not necessary. Further, it is only necessary to conduct a search just once.

The packaged index is created by detecting elements having path names satisfying a given path condition, and grouping the detected elements. When there is a large number of elements having the same logical structure names, the packaged index can be suitably used in the plural structure-specified search. The packaged index enables a search time to be reduced, by saving the need of merging a plurality of results when a search is conducted with a plurality of indexes.

Second Embodiment

In the first embodiment, an index is automatically created. However, before an index is created, a database administrator may be notified of information on the index to be created. After the database administrator instructs that the index be created, the index may be automatically created. Or, the index may be created by the database administrator manually.

A second embodiment describes a system for creating an index, which is capable of enhancing a response performance for the plural structure-specified search by using a minimum necessary packaged index created for a structured document composed of a plurality of elements, and which is further capable of creating a logical structure index from a registered structured document; accumulating an appearance number of the elements; creating a value index definition; and notifying a user of information based on the created value index definition.

<System for Creating an Index>

Figure 17:
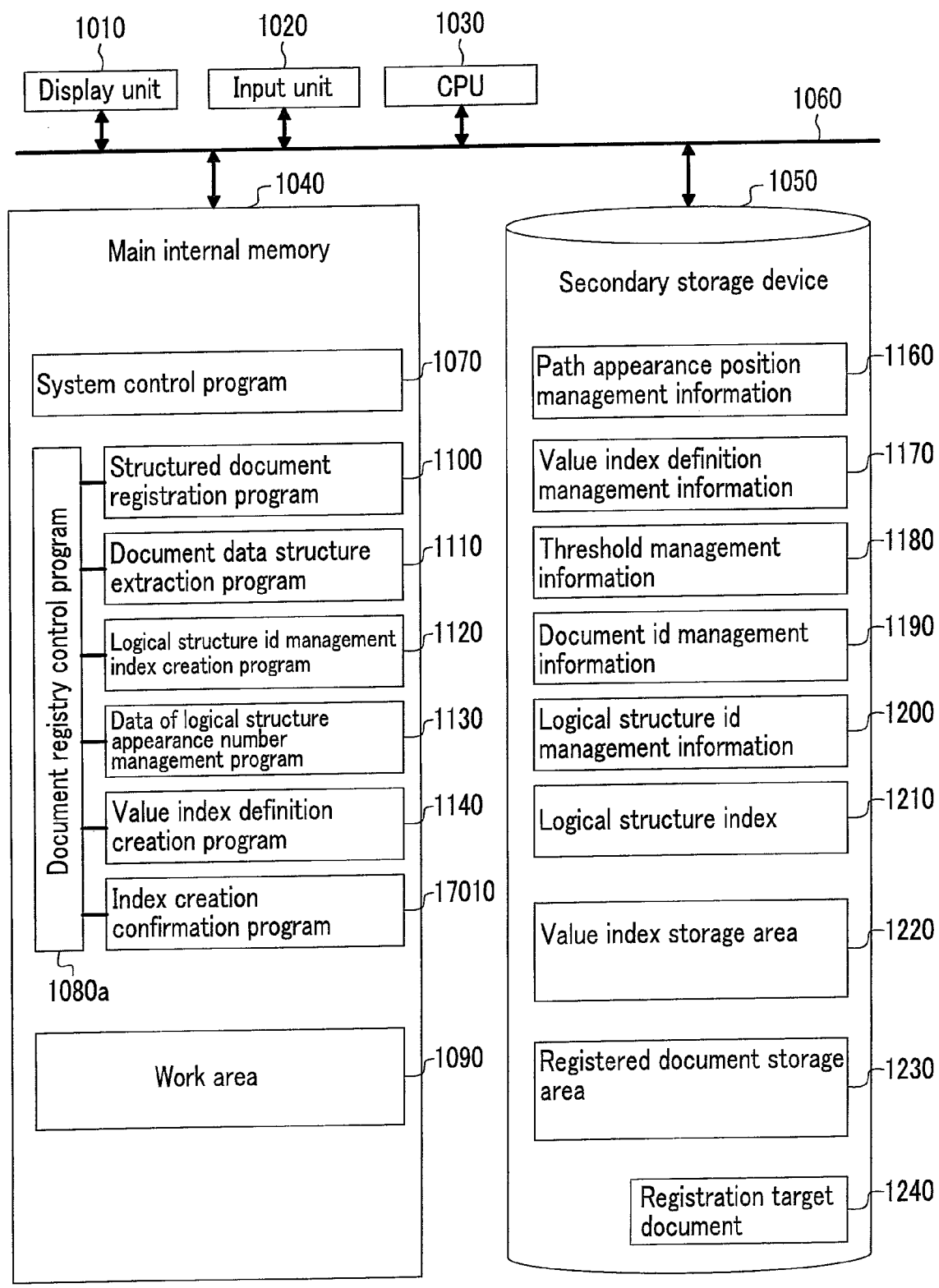
FIG. 17 is a schematic configuration view showing a system for creating an index according to a second embodiment.

FIG. 17 is a schematic configuration view showing a system for creating an index according to the second embodiment.

The system for creating an index according to the second embodiment shown in FIG. 17 is the same as the system for creating an index according to the first embodiment shown in FIG. 1, except that a document registry control program 1080a and an index creation confirmation program 17010, both of which are in the main internal memory 1040, are provided in the second embodiment. In the system for creating an index according to the second embodiment, the same reference characters are assigned to the same components as those in the first embodiment, and a description thereof is omitted.

<Processing Procedure in System for Creating an Index>

Next is described only what is different in the structured document registration processing of the system for creating an index according to the second embodiment, from that according to the first embodiment.

When the system for creating an index is started, the system control program 1070 is loaded from the secondary storage device 1050 into the main internal memory 1040. Then the system control program 1070 receives the registration target documents 1240 through the input unit 1020, and stores the registration target documents 1240 into a predetermined area in the secondary storage device 1050.

When the system control program 1070 receives a processing start instruction inputted through the input unit 1020, the system control program 1070 loads the document registry control program 1080a from the secondary storage device 1050 into the main internal memory 1040 to invoke the document registry control program 1080a, and starts structured document registration processing including a value index creation confirmation according to the second embodiment.

Figure 18:
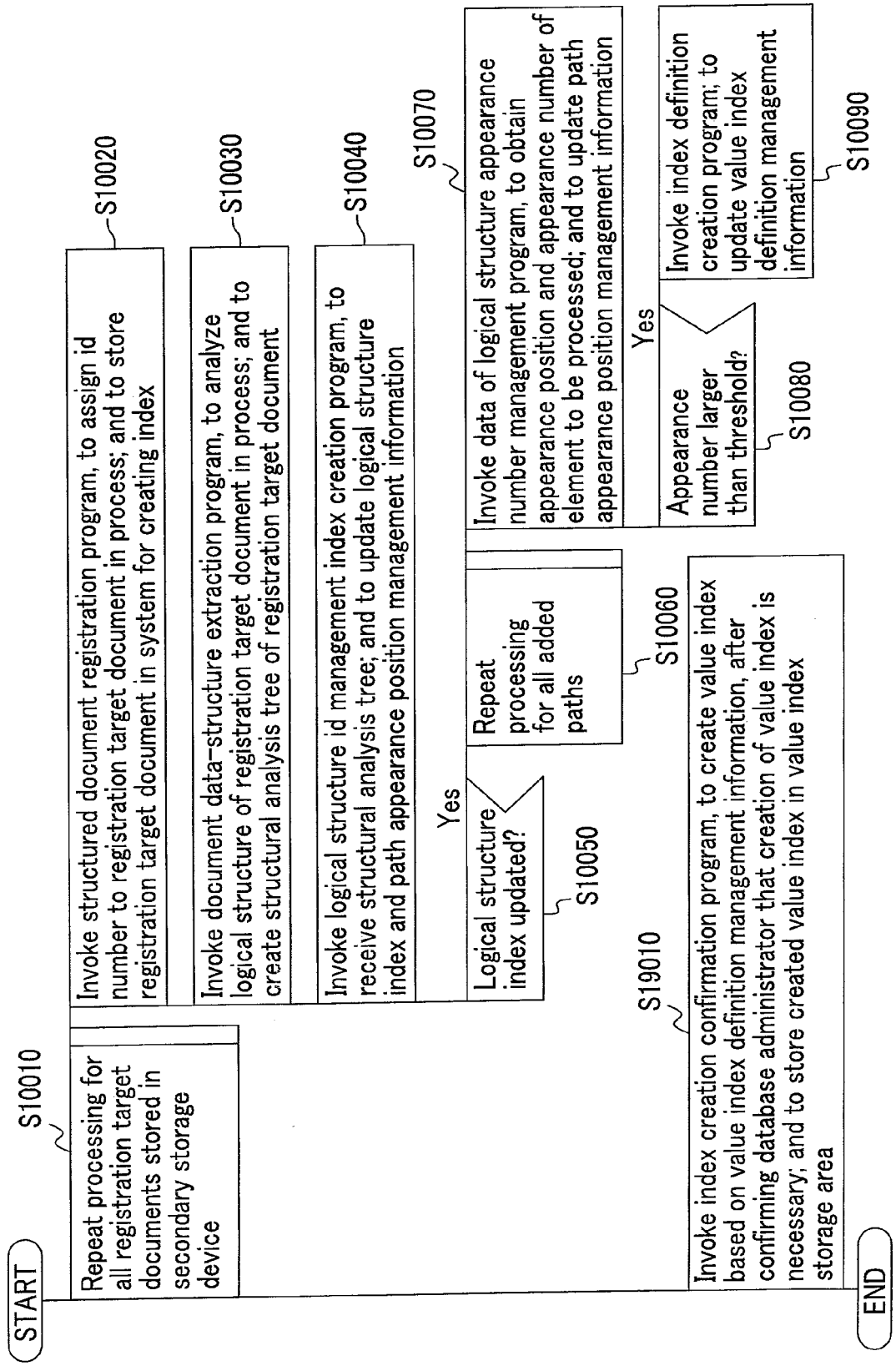
FIG. 18 is a PAD showing processing of a document registry control program according to the second embodiment.

FIG. 18 is a PAD showing the structured document registration processing including the value index creation confirmation according to the second embodiment. Next are described procedures of the structured document registration processing with reference to FIG. 18 (see FIG. 17 according to the necessity). It is to be noted that the structured document registration processing including the value index creation confirmation according to the second embodiment is the same as that shown in FIG. 2 according to the first embodiment, except that step S19010 is provided in the second embodiment, instead of step S10100 in the first embodiment.

In step S19010 of the structured document registration processing, the document registry control program 1080a invokes the index creation confirmation program 17010, which inquires a database administrator whether or not a creation of a value index is necessary, based on the value index definition management information 1170, if it is confirmed that the creation of the value index is necessary, creates the value index, and stores the value index into the value index storage area 1220, thus terminating the processing.

<Index Creation Confirmation Program>

Next is described in detail the index creation confirmation program 17010, which is invoked in step S19010.

Figure 19:
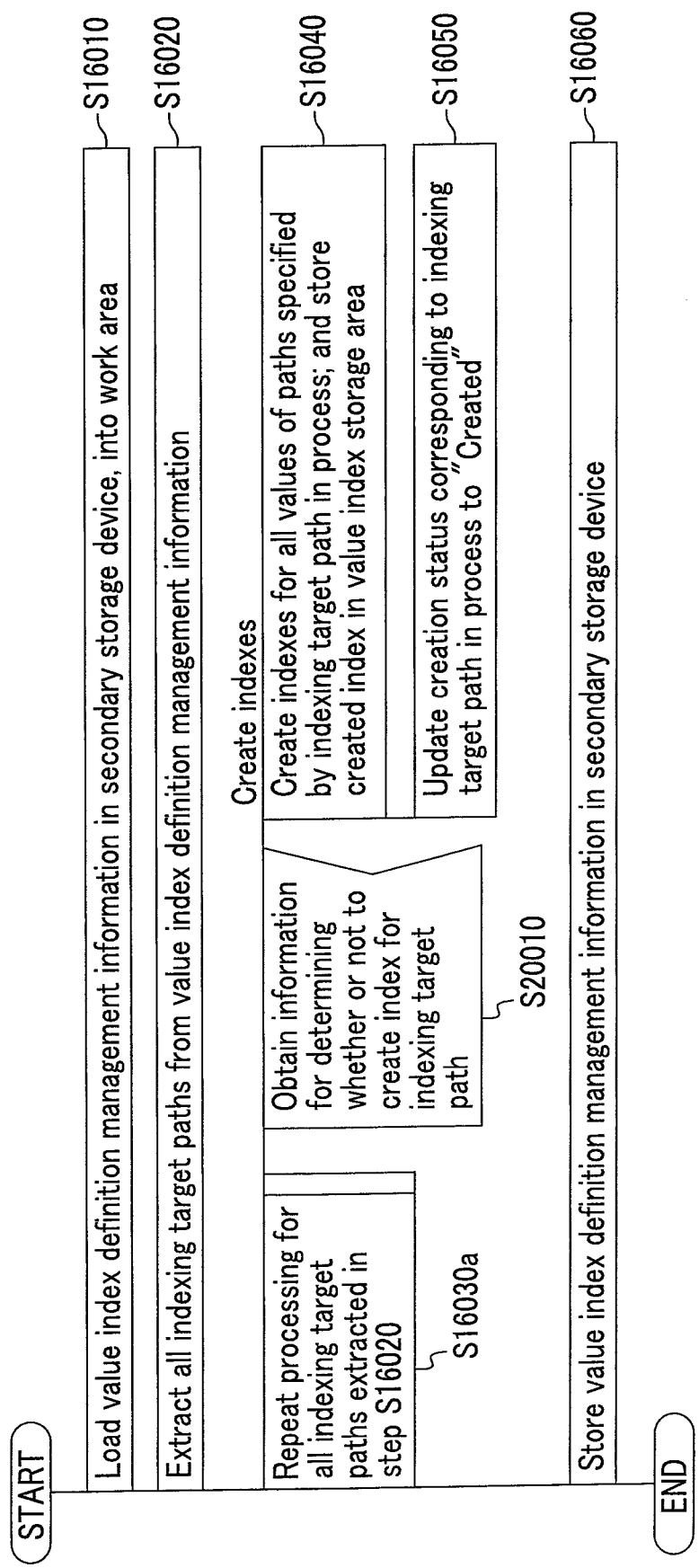
FIG. 19 is a PAD showing processing of an index creation confirmation program according to the second embodiment.

The index creation confirmation program 17010 is invoked by the document registry control program 1080a, and executes confirmation-type value index creation control processing. The confirmation-type value index creation control processing of the index creation confirmation program 17010 is described next with reference to FIG. 19 (see FIG. 17 according to the necessity).

Figure 16:
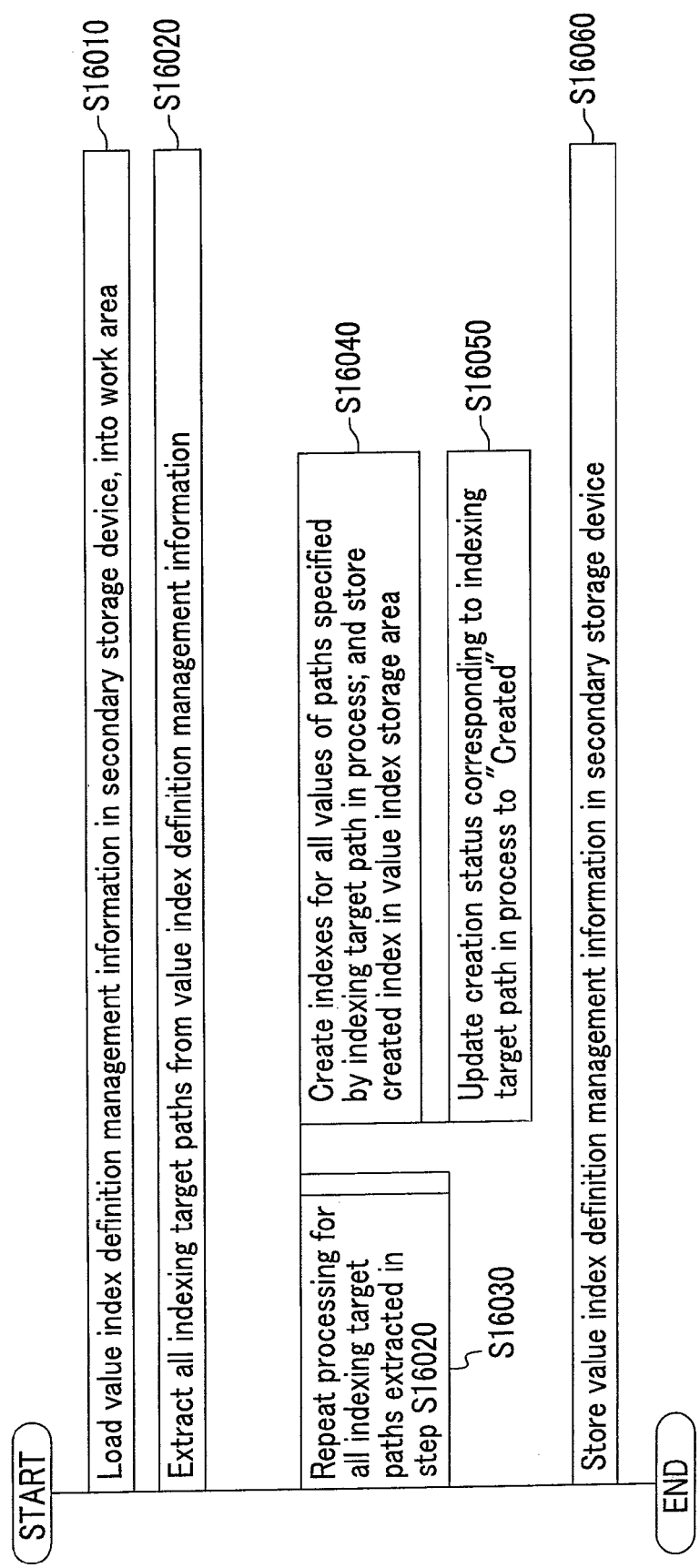
FIG. 16 is a PAD showing processing of a value index creation program.

The confirmation-type value index creation control processing is the same as the value index creation control processing according to the first embodiment shown in FIG. 16, except step S16030a and step S20010.

Like the value index creation control processing in FIG. 16, the index creation confirmation program 17010 executes step S16010 and step S16020, and repeats value index creation confirmation processing for all indexing target paths 6010 extracted from the value index definition management information 1170 (see FIG. 15) in step S16020 (step S16030a)

In the value index creation confirmation processing, the index creation confirmation program 17010 obtains information for determining whether or not an index for the indexing target path 6010 in process is created (step S20010). Then the index creation confirmation program 17010 creates a screen for value index creation confirmation to be described later; displays the screen on the display unit 1010; and obtains information for determining whether or not the index is to be created, according to an instruction input by a database administrator through the input unit 1020.

FIG. 20 shows an example of the screen for value index creation confirmation created by the index creation confirmation program 17010 in step S20010.

The screen for value index creation confirmation shown in FIG. 20 is created based on the value index definition management information 1170 in process, and is composed of such items as an indexing target path 18010, a creation status 18020, and a question of "Need creation?" 18030. Each item is described next.

The item of the indexing target path 18010 represents a path name for which an index is to be created, corresponding to the value index definition management information 1170. If the indexing target path 18010 includes a plurality of path names, a packaged index can be created.

The item of the creation status 18020 is composed of two statuses such as "Created" and "Not created". If an index has been already created for the indexing target path 18010 corresponding to the creation status 18020, which is determined based on the value index definition management information 1170, "Created" is displayed. If not, "Not created" is displayed.

The item of "Need creation?" 18030 is displayed only when the creation status 18020 is "Not created". The "Need creation?" 18030 includes a pair of radio buttons for selecting whether or not an index is to be created for a corresponding indexing target path 18010; and a submit button for submitting information selected by either of the radio buttons.

When a database administrator clicks on the submit button 18040 in the value index creation conformation screen, step S20010 is terminated. If "Yes" is selected in the "Need creation?" 18030 with the radio button, the index creation confirmation program 17010 obtains information indicating that an index should be created; creates indexes for all path values specified by the indexing target path 6010 in process; stores the created indexes into a value index storage area 1220 (step S16040); and updates the creation status 6020 corresponding to the indexing target path 6010 in process of the value index definition management information 1170 to "Created" (step S16050).

When the value index creation confirmation processing is completed for all the indexing target paths 6010, the index creation confirmation program 17010 stores the value index definition management information 1170 in the work area 1090, into the secondary storage device 1050 (step S16060), thus terminating the confirmation-type value index creation control processing.

The above-mentioned is what is different in the structured document registration processing according to the second embodiment, from that according to the first embodiment.

In the system for creating an index according to the second embodiment, when there is a large number of elements having the same logical structure names, paths satisfying a given condition is detected; the detected paths are subjected to grouping and presented to a database administrator; and a packaged index is created and used for the plural structure-specified search under an instruction of the database administrator. With the packaged index, extra steps can be saved. For example, if a search is conducted not with the packaged index but with a plurality of indexes, data of elements other than specified data has to be called up, or searched results has to be merged. Thus the packaged index allows a search time to be reduced.

This embodiment describes a configuration in which a database administrator is informed of the creation status of a packaged index; the database administrator is inquired whether or not the packaged index should be created; and, if the database administrator instructs so, the index is created. However, another configuration is possible in which only the database administrator is informed of creation status of a packaged index.

In this case, the database administrator may create the index afterwards manually.

Further the database administrator may be informed of the creation status of a packaged index, not when the structured document registration processing is conducted, but only when the database administrator inquires about the creation status of the packaged index.

Third Embodiment

The first embodiment describes the system for creating an index in which a packaged index is created only based on terminal elements. The first embodiment also describes the system for creating an index in which a target for indexing is a single element name.

However, a packaged index which is created only based on terminal elements cannot always be used in the plural structure-specified search based on a hierarchical structure. For example, when an element of a path condition "//Magazine/Price" is "Y700", an index based on only terminal elements such as "//Price" cannot be used. Thus, a packaged index is created based on elements other than terminal elements or a hierarchical combination of a plurality of element names (for example, a path condition including a plurality of element names based on the hierarchical structure, such as the path condition "//Magazine/Price"). Such a packaged index is created and used in a system for creating an index according to a third embodiment to be described below.

The third embodiment describes a system for creating an index, which is capable of enhancing a response performance of the plural structure-specified search by using a minimum necessary packaged index created for a structured document composed of a plurality of element names, and which is further capable of creating a logical structure index from a registered structured document; accumulating an appearance number of path names including a combination of a plurality of element names based on a hierarchical structure; and creating an index definition.

<System for Creating an Index>

Figure 21:
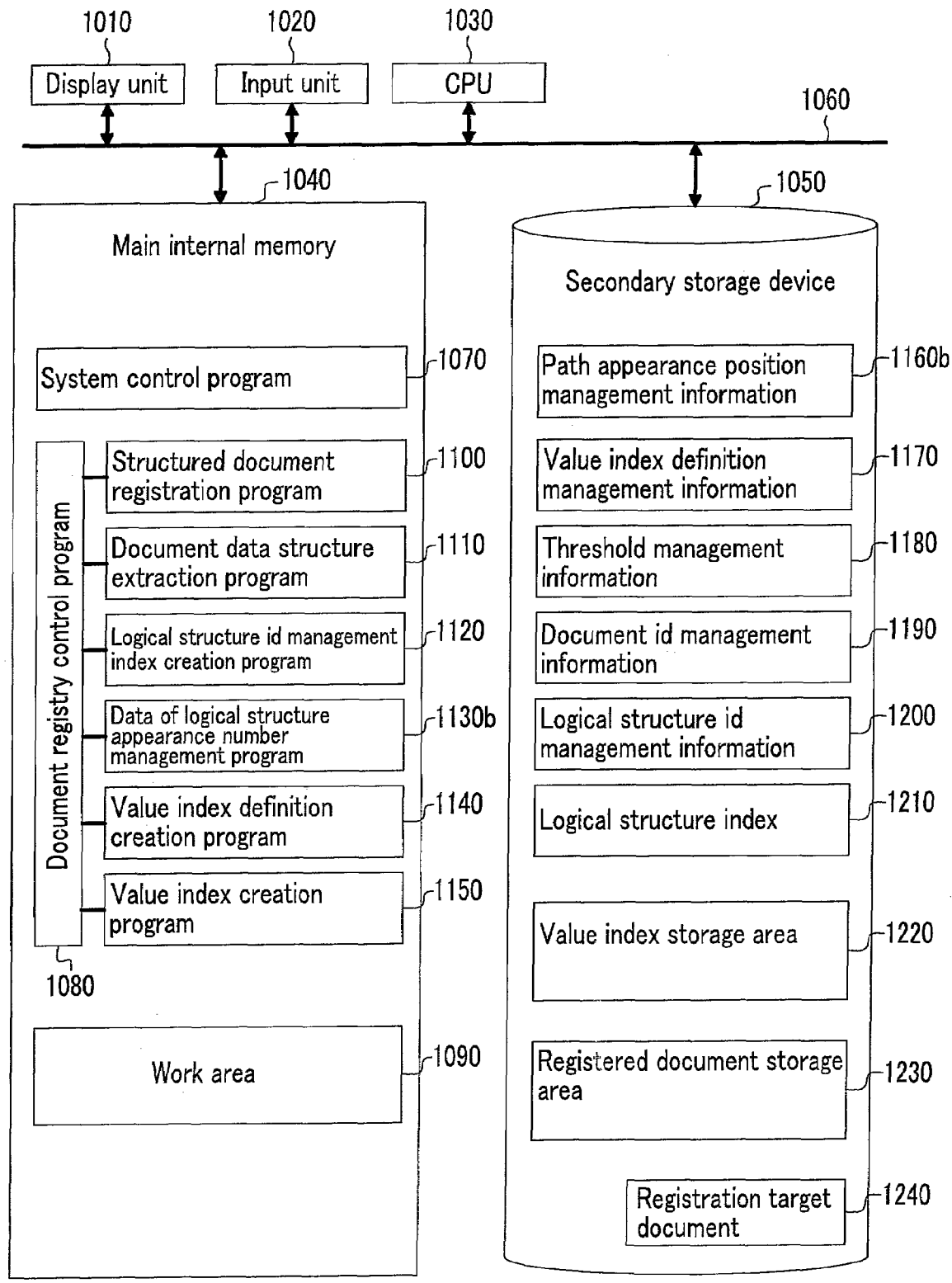
FIG. 21 is a schematic configuration view showing a system for creating an index according to a third embodiment.

FIG. 21 is a schematic configuration view showing a system for creating an index in the third embodiment.

The system for creating an index shown according to the third embodiment in FIG. 21 is the same as the system for creating an index according to the first embodiment shown in FIG. 1, except that a data of logical structure appearance number management program 1130*b* and a path appearance position management information 1160*b*, both of which are in the main internal memory 1040, are provided in the third embodiment. In the system for creating an index according to the third embodiment, the same reference characters are assigned to the same components as those in the first embodiment, and a description thereof is omitted.

<Processing Procedure in System for Creating an Index>

In the third embodiment, what is different from the first embodiment is only contents executed by the data of logical structure appearance number management program 1130 in step S10070 in the structured document registration processing.

Therefore, next is only described processing procedures conducted by the data of logical structure appearance number management program 1130*b* in the third embodiment.

<Data of Logical Structure Appearance Number Management Program>

Figure 22:
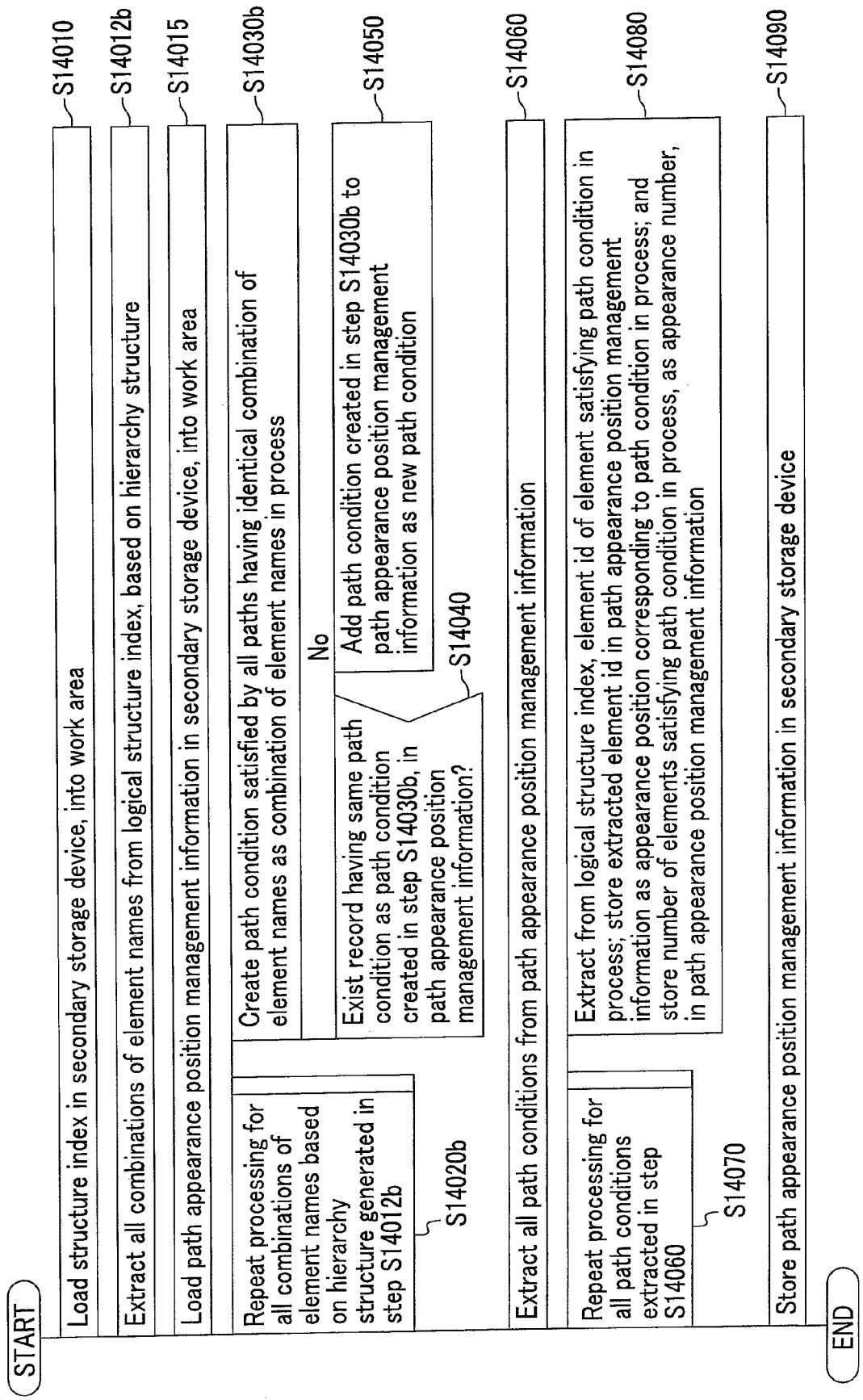
FIG. 22 is a PAD showing processing of a data of logical structure appearance number management program according to the third embodiment.

The data of logical structure appearance number management program 1130*b* is invoked by the document registry control program 1080, and executes path appearance number management processing. The path appearance number management processing of the data of logical structure appearance number management program 1130*b* is described with reference to FIG. 22.

Figure 12:
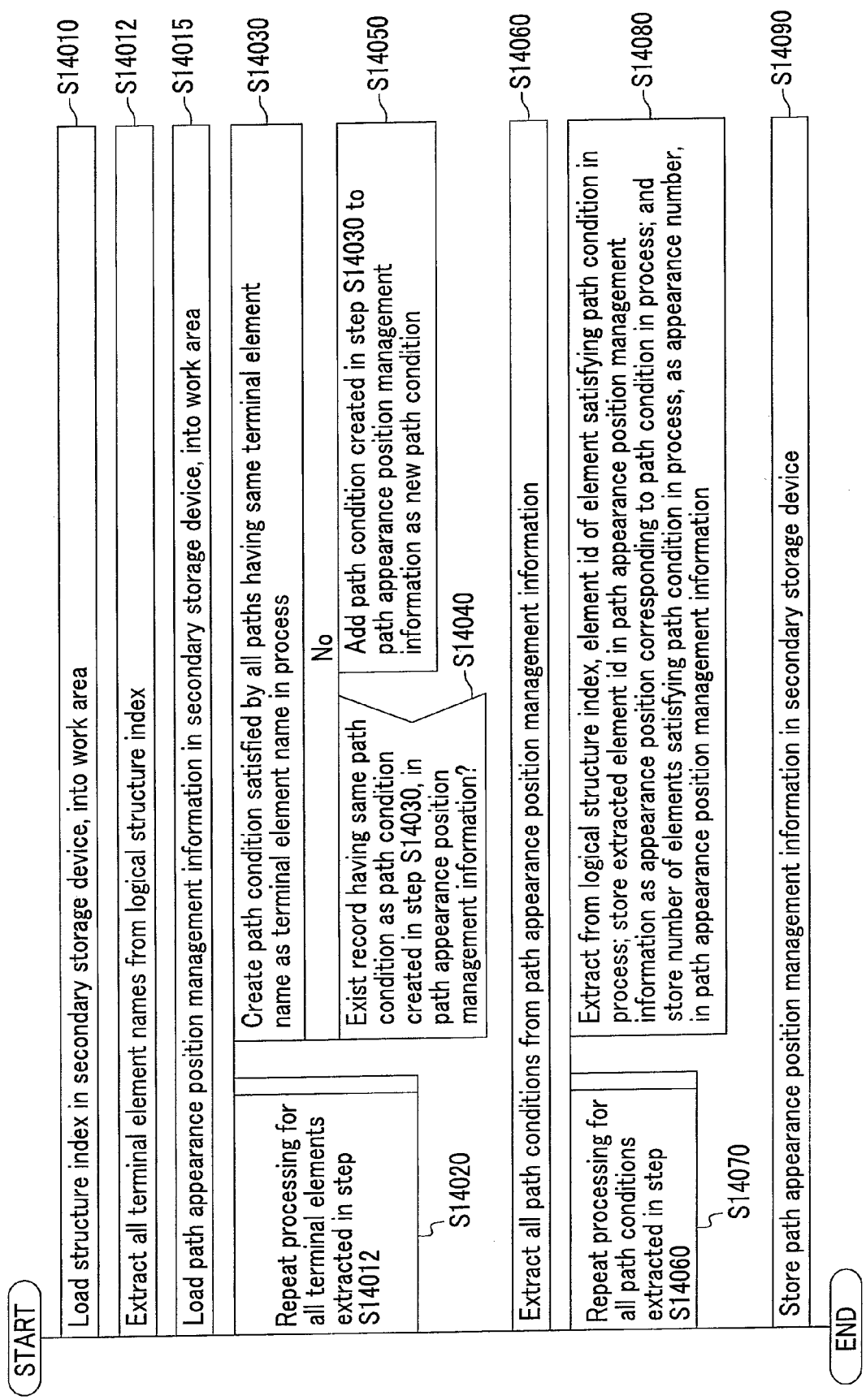
FIG. 12 is a PAD showing processing of a data of logical structure appearance number management program.

The path appearance number management processing in the third embodiment is the same as that by the data of logical structure appearance number management program 1130 according to the first embodiment shown in FIG. 12, except step S14012*b*, step S14020*b* and step S14030*b*.

The data of logical structure appearance number management program 1130*b* extracts all combinations of element names based on the hierarchical structure from the logical structure index 1210 (step S14012*b*), and loads the path appearance position management information 1160*b* in the secondary storage device 1050, into the work area 1090 (step S14015).

The data of logical structure appearance number management program 1130*b* repeats path addition processing for all the combinations of element names based on the hierarchical structure extracted in step S14012*b* (step S14020*b*). Next is described the path addition processing in step S14030*b* through step S14050.

The data of logical structure appearance number management program 1130*b* then creates a path condition satisfied by all paths having an identical combination of element names to a combination of element names in process (step S14030*b*).

FIG. 23 is a view showing the path appearance position management information 1160*b* created in the path appearance number control processing according to the third embodiment. The path appearance position management information 1160*b* in FIG. 23 is different from the path appearance position management information 1160 using only terminal elements shown in FIG. 13 according to the first embodiment at the following points: some pieces of data in the path condition 5010*b* are composed of a single element name but others a plurality of element names based on the logical structure; and the elements "2, 5, 10" included in the path condition of the "//Price" 23010 is also included in the elements of the appearance position 5020 of the path condition "//Magazine/Price" 23020 and the path condition "//Book/Price" 23030.

When the value index definition creation program 1140 executes the value index definition creation processing based on the path appearance position management information 1160*b* created as described above, an index is created for a set of elements included in "//Magazine/Price" 23020, if the appearance number 5030 of elements in the path condition "//Magazine/Price" 23020 is larger than a value index creation execution threshold.

After that, the data of logical structure appearance number management program 1130*b* executes the same procedures as those by the data of logical structure appearance number management program 1130 shown in FIG. 12 according to the first embodiment (step S14040 through step S14090).

The above-mentioned is what is different in the structured document registration processing according to the third embodiment, from that according to the first embodiment.

In the system for creating an index in the third embodiment, when there is a large number of elements having the same logical structure names, paths satisfying a given condition is detected; the detected paths are subjected to grouping; and a packaged index is created and used in the plural structure-specified search based on the hierarchical structure. With the packaged index, extra steps can be saved. For example, if a search is conducted not with the packaged index but with a plurality of indexes, search results have to be merged. The packaged index allows a search time to be reduced.

Fourth Embodiment

The systems for creating an index according to the first through third embodiments assume the full automatic indexing method, in which indexes for every terminal element of the logical structure index 1210 are created.

Instead, the system for creating an index may create an index for such an element that would require a substantially longer search time without the index.

For example, if a search time is only 0.01 seconds when a direct text-scanning is conducted for a structured document with the path condition "/New-secondhand/Magazine/Price", an index for the path condition "/New-secondhand/Magazine/Price" may not be created.

A fourth embodiment describes a system for creating an index, which is capable of enhancing a response performance of a plural structure-specified search by using a minimum necessary packaged index created for a structured document composed of a plurality of element names, and which is further capable of accumulating an actual appearance number of elements among all registered documents; and determining that an index be created only for the elements having a large appearance number.

<System for Creating an Index>

Figure 24:
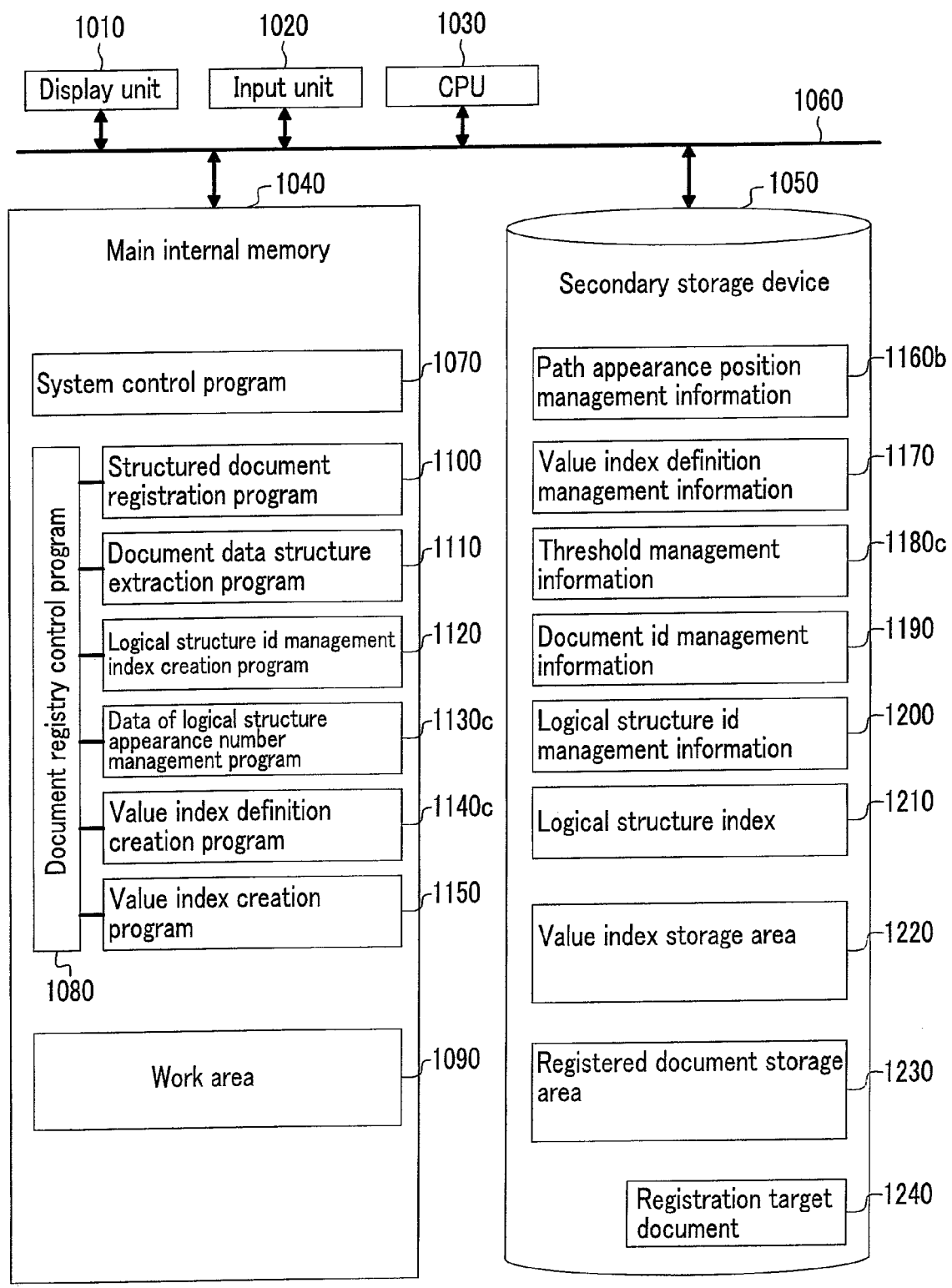
FIG. 24 is a schematic configuration view showing a system for creating an index according to a fourth embodiment.

FIG. 24 is a schematic configuration view showing the system for creating an index according to the fourth embodiment. The system for creating an index shown in FIG. 24 is the same as the system for creating an index according to the third embodiment shown in FIG. 21, except that a data of logical structure appearance number management program 1130c and an index definition creation program 1140c, both of which are in the main internal memory 1040, and a threshold management information 1180c, which is in the secondary storage device 1050, are provided in the fourth embodiment. In the system for creating an index according to the fourth embodiment, the same reference characters are assigned to the same components as those in the first through the third embodiments, and a description thereof is omitted.

<Processing Procedures in System for Creating an Index>

In the fourth embodiment, what is different from the first embodiment in the structured document registration processing according to the first embodiment shown in FIG. 2 is: contents executed by the data of logical structure appearance number management program 1130 in step S10070; and contents executed by the value index definition creation program 1140 in step S10090. Therefore, next is described only processing procedures conducted by the data of logical structure appearance number management program 1130b and the value index definition creation program 1140c.

<Data of Logical Structure Appearance Number Management Program>

Figure 25:
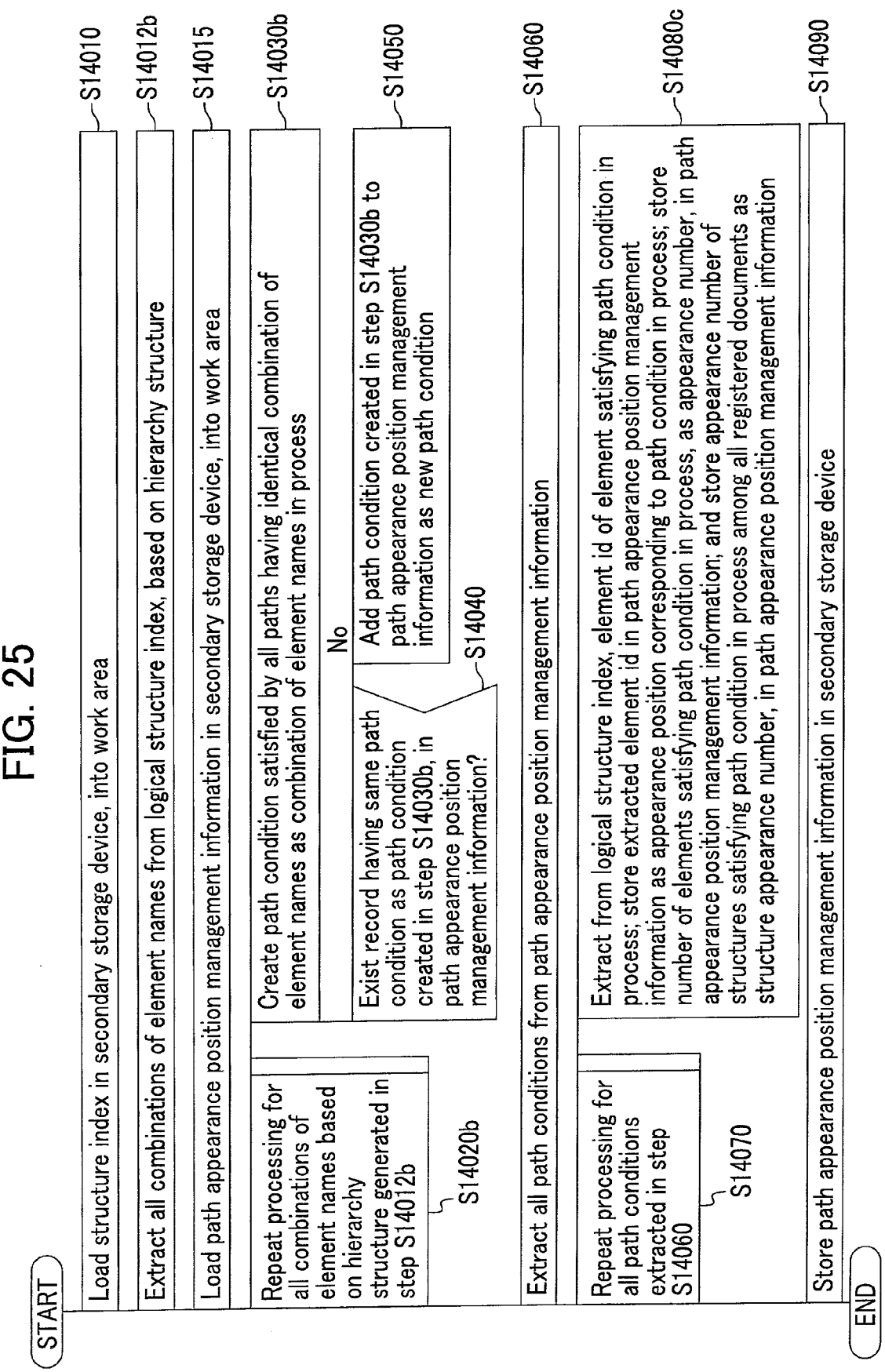
FIG. 25 is a PAD showing processing of a data of logical structure appearance number management program according to the fourth embodiment.

The data of logical structure appearance number management program 1130c is invoked by the document registry control program 1080, and executes path appearance number management processing based on the logical structure appearance number. The path appearance number management processing of the data of logical structure appearance number management program 1130c is described with reference to FIG. 25. The path appearance number management processing based on the logical structure appearance number according to the fourth embodiment is the same as that according to the third embodiment shown in FIG. 22, except step S14080c.

The data of logical structure appearance number management program 1130c extracts all elements from the logical structure index 1210 (step S14012b), and loads the path appearance position management information 1160b (see FIG. 23) in the secondary storage device 1050, into the work area 1090 (step S14015).

The data of logical structure appearance number management program 1130c repeats path addition processing in step S14030b through step S14050 for element name combinations of all the elements based on the hierarchical structure and extracted in step S14012b (step S14020b).

The data of logical structure appearance number management program 1130c creates a path condition satisfied by all paths having an identical combination of element names to a combination of element names in process (step S14030b).

The data of logical structure appearance number management program 1130c determines whether or not a record having the same path condition as the path condition 5010 created in step S14030b exists in the path appearance position management information 1160b in the secondary storage device 1050 (step S14040). If the same path condition does not exist in the path appearance position management information 1160b, the path condition created in step S14030 is added to the path appearance position management information 1160b as a new path condition for the records (step S14050).

The data of logical structure appearance number management program 1130c extracts all path conditions from the path appearance position management information 1160b updated by the path addition processing (step S14060), and repeats the processing in step S14080c for all the path conditions (step S14070)

In step S14080c, the data of logical structure appearance number management program 1130c extracts an element id of an element satisfying the path condition 5010b in process from the logical structure index 1210 in the secondary storage device 1050; stores the element id in the path appearance position management information 1160b as the appearance position 5020 corresponding to the path condition 5010b in process; and also stores the number of elements satisfying the path condition 5010b in process, in the path appearance position management information 1160b as the appearance number 5030.

Further, the data of logical structure appearance number management program 1130 computes an appearance number of the logical structures satisfying the path condition 5010b in process among all the registered documents, and stores the appearance number in the path appearance position management information 1160b as an "appearance number among all registered documents" 25010.

FIG. 26 is an example of the path appearance position management information 1160b according to the fourth embodiment after step S14080c is conducted. As compared to the path appearance position management information 1160b shown in FIG. 23 according to the third embodiment, the path condition 5010b in the path appearance position management information 1160b shown in FIG. 26 has additional records such as "/Magazine/Price" 23040, "/Used/Book/Price" 23050 and "/New-secondhand/Book/Price" 23060.

These records are registered by the data of logical structure appearance number management program 1130c, which computes the appearance number of the logical structures satisfying the path condition 5010b in process among all the registered documents, and stores the appearance number as the "appearance number among all registered documents" 25010.

The data of logical structure appearance number management program 1130c then stores the path appearance position management information 1160b in the secondary storage device 1050 (step S14090), thus terminating the path appearance number management processing based on the logical structure appearance number.

<Value Index Definition Creation Program>

The value index definition creation program 1140c is started by the document registry control program 1080, and executes value index definition creation processing based on the logical structure appearance number. The value index definition creation processing based on the logical structure appearance number by the index definition creation program 1140c is described with reference to FIG. 27. As compared to the value index definition creation processing shown in FIG. 14 according to the first embodiment, the value index definition creation processing based on the logical structure appearance number according to the fourth embodiment has step S15025c, instead of step S15025, and additionally has step S27010 between step S15030 and S15040.

In the fourth embodiment, threshold management information 1180c includes not only a value index creation execution threshold, which is a threshold of the path appearance number, but also a logical structure appearance number threshold, which is a threshold of the logical structure appearance number.

The value index definition creation program 1140c loads the path appearance position management information 1160b (see FIG. 23) in the secondary storage device 1050, into the work area 1090 (step S15010), and extracts all path conditions 5010 included in the path appearance position management information 1160b (step S15020).

The value index definition creation program 1140c then loads the threshold management information 1180 in the secondary storage device 1050, into the work area 1090 as a logical structure appearance number threshold and a value index creation execution threshold (step S15025c), and also loads the value index definition management information 1170 into the work area 1090 (step S15027).

The value index definition creation program 1140c repeats value index creation determination processing in step S27010 through step S15070 for all the path conditions 5010b extracted in step S15020 (step S15030).

In the value index creation determination processing, the value index definition creation program 1140 determines whether or not the logical structure appearance number 25010 (see FIG. 26) corresponding to the path condition 5010b in process among all the registered documents is larger than the logical structure appearance number threshold (step S27010). If the logical structure appearance number 25010 is larger than the logical structure appearance number threshold, the procedures in and after step S15040 are executed, thus terminating the value index definition creation processing based on the logical structure appearance number.

The above-mentioned is the contents of the structured document registration processing executed in the fourth embodiment, which are different from those executed in the third embodiment.

When the system for creating an index according to the fourth embodiment conducts a search for a path whose value index has not yet been created, the system for creating an index text-scans the registered documents in the registered document storage area 1230.

As described above, when there is a large number of registered documents actually having terminal elements, an index is created only for the terminal element whose appearance number is large. This makes it possible to create minimum necessary indexes. As a result, a time necessary for updating and maintenance of the indexes can be reduced.

Fifth Embodiment

In the systems for creating an index according to the first through fourth embodiments, whether or not an index is created is determined based on the appearance number of elements or on the appearance number of logical structures in structured documents in the registered document storage area.

The system for creating an index may have a function of deleting an index which is no longer necessary because a new substitute index is created. The system for creating an index may have a function of informing a database administrator that there is an unnecessary index determined to be not used any longer and is to be deleted, avoiding an automatic deletion.

A fifth embodiment describes a system for creating an index, which is capable of enhancing a response performance of a plural structure-specified search by using a minimum necessary packaged index created for a structured document composed of a plurality of element names, and which has a function of deleting an index whose indexing target paths is overlapped with another index, and whose overlapped ratio is larger than a predetermined threshold.

<System for Creating an Index>

Figure 28:
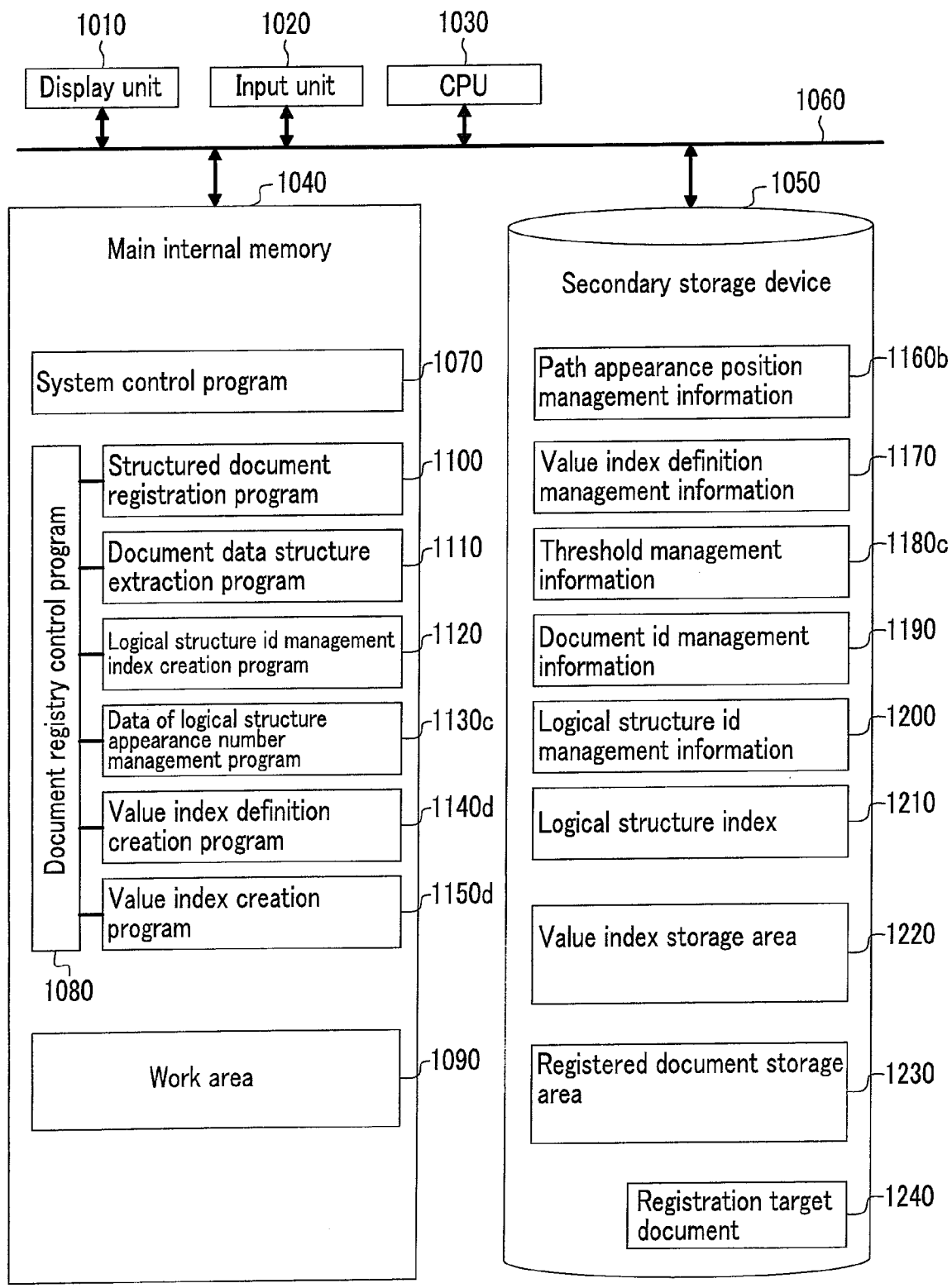
FIG. 28 is a schematic configuration view showing a system for creating an index according to a fifth embodiment.

FIG. 28 is a schematic configuration view showing the system for creating an index according to the fifth embodiment. The system for creating an index shown in FIG. 28 is the same as the system for creating an index according to the fourth embodiment shown in FIG. 24, except that an index definition creation program 1140c and a value index creation program 1150d, both of which are in the main internal memory 1040, are provided in the fifth embodiment. In the system for creating an index according to the fifth embodiment, the same reference characters are assigned to the same components as those in the fourth embodiment, and a description thereof is omitted.

Description below is made only for what is different from the fourth embodiment.

<Value Index Definition Creation Program>

Figure 29:
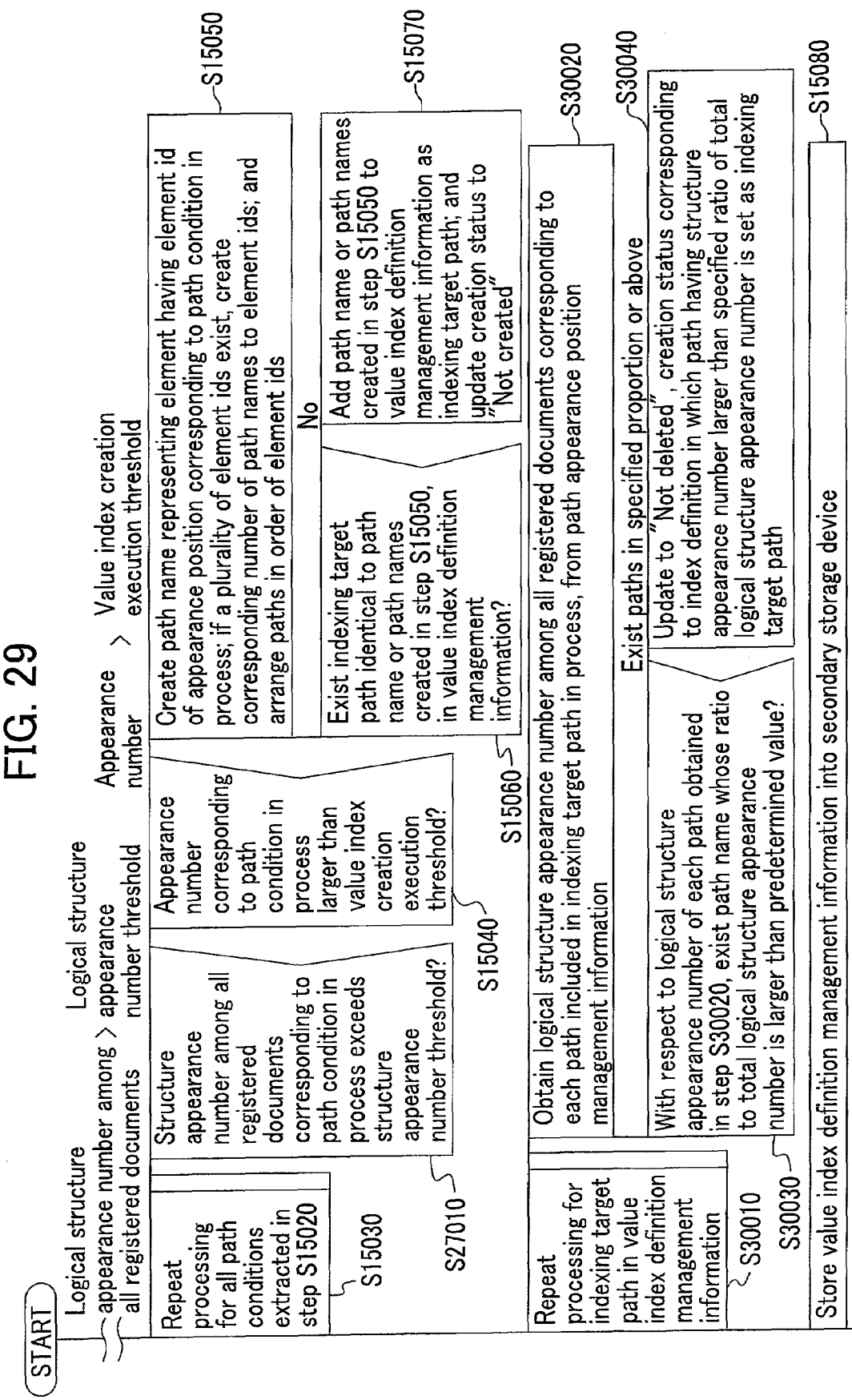
FIG. 29 is a PAD showing processing of a value index definition creation program according to the fifth embodiment.

The value index definition creation program 1140d is invoked by the document registry control program 1080, and executes deletion-capable value index definition creation processing based on the logical structure appearance number. The deletion-capable value index definition creation processing based on the logical structure appearance number by the value index definition creation program 1140d is described with reference to FIG. 29.

Figure 27:
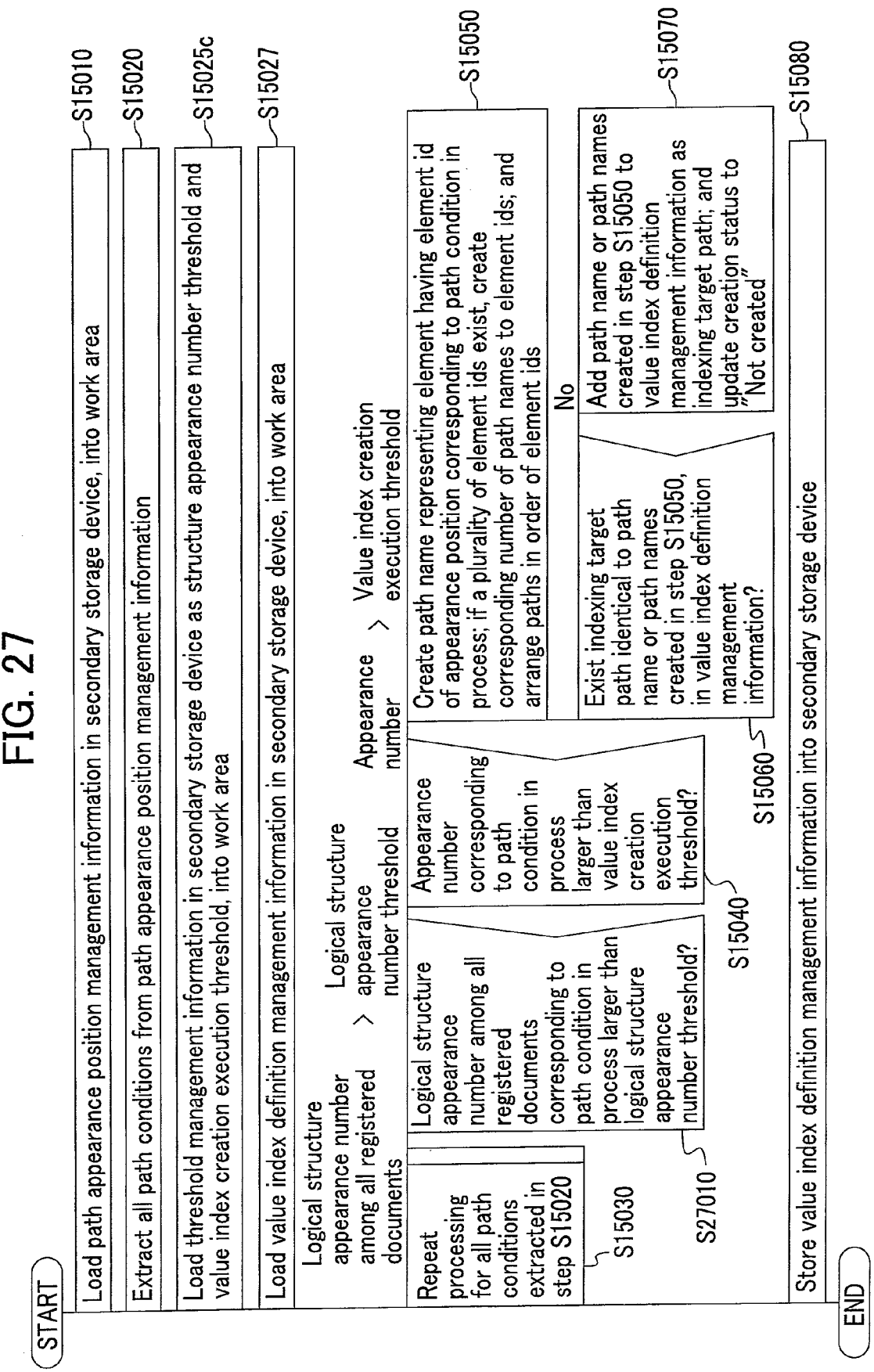
FIG. 27 is a PAD showing processing of a value index definition creation program according to the fourth embodiment.

Path appearance number management processing according to the fifth embodiment is executed including step S30010 through step S30040, after step S15070. It is to be noted that step S15010 through step S15027 according to the fourth embodiment are shown in FIG. 27, but are omitted in FIG. 29 for simplification.

The following description is made only for processing procedures in and after step S30010.

After the value index definition creation program 1140d updates the value index definition management information 1170 with procedures until step S15070 (see FIG. 15), the value index definition creation program 1140d repeats value index deletion definition creation processing for the indexing target path 6010 in the value index definition management information 1170 (step S30010). Next is described the value index deletion definition creation processing.

The value index definition creation program 1140d obtains the logical structure appearance numbers 25010 among all registered documents, corresponding to each path name included in the indexing target path 6010 in process, from the path appearance position management information 1160b (see FIG. 26) (step S30020).

The value index definition creation program 1140d totals the logical structure appearance numbers for each path name obtained in step S30020; computes the total logical structure appearance numbers in the indexing target path 6010 in process; compares the logical structure appearance number for each path name to the total logical structure appearance number; and determines whether or not there is a path name whose ratio of the appearance number to the total logical structure appearance number is larger than a predetermined value (step S30030).

When it is determined in step S30030 that there is a path name whose ratio of the appearance number to the total logical structure appearance number is larger than a predetermined value, the creation status 6020 (see FIG. 15) in the value index definition management information 1170 corresponding to the path name is updated to "Not deleted".

The value index definition creation program 1140d then stores the value index definition management information 1170 in the work area 1090, into the secondary storage device 1050 (step S15080), thus terminating the value index definition creation processing.

<Value Index Creation Program>

Figure 30:
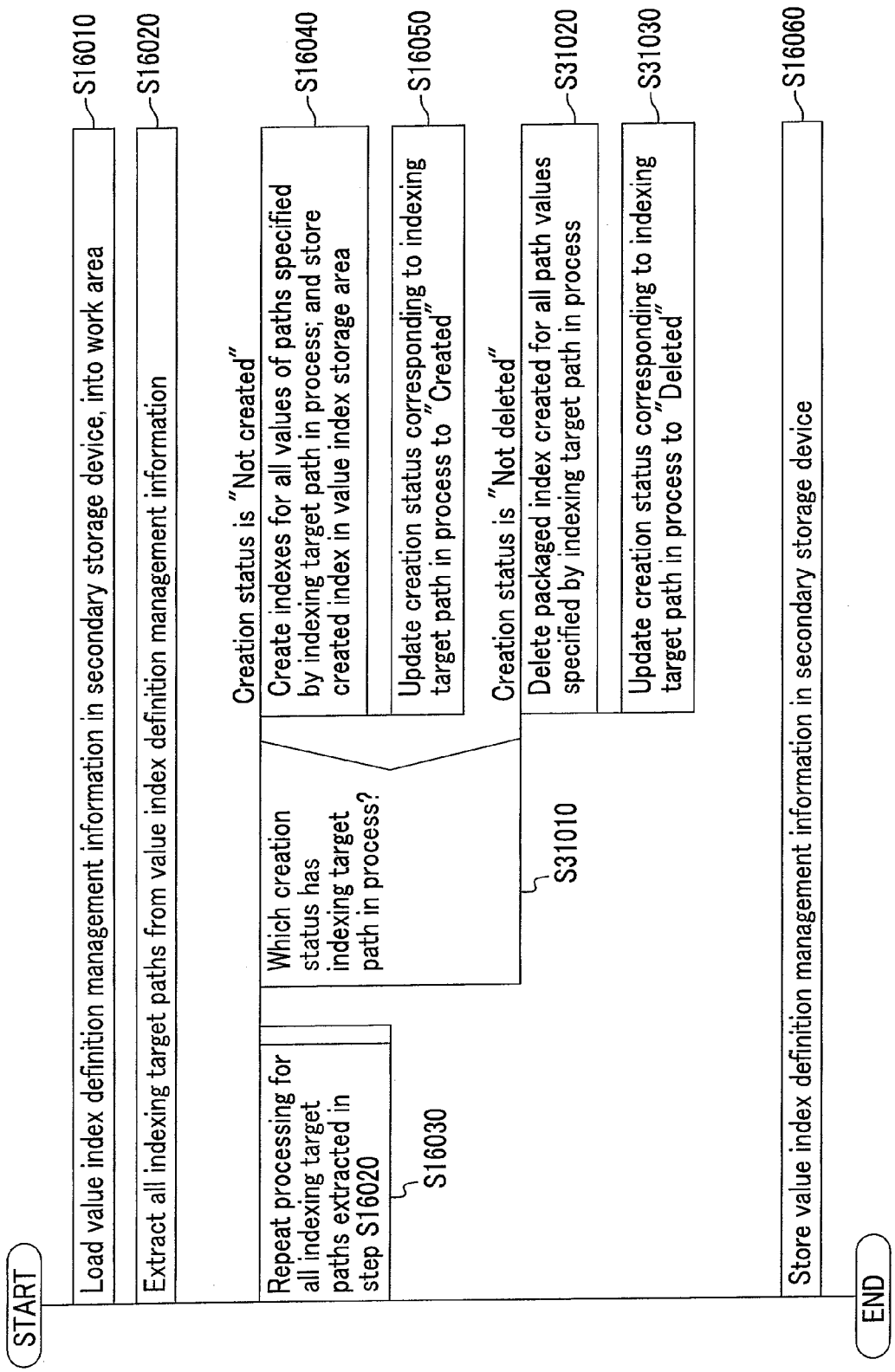
FIG. 30 is a view showing processing of a value index creation program according to the fifth embodiment.

The value index creation program 1150d is invoked by the document registry control program 1080, and executes value index update control processing. The index update control processing of the value index creation program 1150d is described with reference to FIG. 30. The value index update control processing according to the fifth embodiment is the same as the value index creation control processing in FIG. 16 according to the first embodiment, except step S31010 through step S31030 are additionally provided in the fifth embodiment.

The value index creation program 1150d loads the value index definition management information 1170 in the secondary storage device 1050, into the work area 1090 (step S16010), and extracts all indexing target paths 6010 (step S16020).

The value index creation program 1150d repeats value index update execution processing for all the indexing target paths 6010 extracted in step S16020 (step S16030). Next is described the value index update execution processing.

The value index creation program 1150d references the value index definition management information 1170, and determines whether or not the creation status 6020 corresponding to the indexing target path 6010 in process is either "Not created" or "Not deleted" (step S31010). If the creation status 6020 is "Not created", the value index creation program 1150d creates indexes for all paths specified by the indexing target path 6010 in process; stores the created indexes in the value index storage area 1220 in the secondary storage device 1050 (step S16040); and updates the creation status 6020 in the value index definition management information 1170 corresponding to the indexing target path 6010 in process to "Created" (step S16050).

On the other hand, if it is determined in step S31010 that the creation status 6020 is "Not deleted", the value index creation program 1150d deletes a packaged index which is created for elements of the path names specified in the indexing target path 6010 in process, from the value index storage area 1220 (step S31020), and updates the creation status 6020 corresponding to the indexing target path 6010 in process to "Deleted" (step S31030).

When the value index update execution processing is completed for all the indexing target paths 6010, the value index creation program 1150d stores the value index definition management information 1170 in the work area 1090, into the secondary storage device 1050 (step S16060), thus terminating the value index update control processing.

The above-mentioned is the contents of the structured document registration processing different from those in the fourth embodiment.

In the system for creating an index according to the fifth embodiment, when a search is conducted for a path name whose value index has been already deleted, an index which includes the path name and which has a logical structure appearance number closest to a logical structure appearance number of the path name, for the indexing target path 6010 is used. Subsequently, elements other than that of the path name are deleted from the obtained search results, thus allowing the search to be conducted.

As described above, an index which is not used any longer is deleted from the system for creating an index, because a packaged index is created. This enables only a minimum necessary index to be created. As a result, a time necessary for updating and maintenance of indexes can be reduced.

The system for creating an index according to the fifth embodiment is the same as the system for creating an index according to the first embodiment, and also has the following functions: creating a packaged index for path names composed of a plurality of element names based on the hierarchical structure, which is according to the third embodiment; and creating an index only when there is a large number of registered documents having terminal elements, which is according to the fourth embodiment. The system for creating an index according to the fifth embodiment further has a function of deleting an index which is not used any longer, because a new substitute index is created.

In other words, the system for creating an index according to the fifth embodiment is capable of enhancing a response performance of the plural structure-specified search by using a minimum necessary packaged index created for a structured document composed of a plurality of element names. The system for creating an index according to the fifth embodiment also has the functions as follows. One is to create a logical structure index from a registered structured document; accumulate an appearance number of paths composed of combinations of a plurality of element names based on the hierarchical structure; and create an index definition. Another is to accumulate an actual appearance number of an element of interest among all registered documents; and creates an index only for the element having a large appearance number. The other is to delete an index whose indexing target paths is overlapped with another index, and the overlapped ratio is larger than a predetermined threshold.

The system for creating an index having those functions does not have, in its initial stage, indexes for each path name, because the system for creating an index conducts a search by directly text-scanning a structured document stored in the registered document storage area 1230, using an appearance number of each logical structure extracted from a registered structured document, and also using an appearance number of elements accumulated based on the logical structure index 1210 created from the registered structured document. When there is a large number of registered documents, the system for creating an index according to the fifth embodiment has the function of creating a minimum necessary index definition according to the necessity.

The present invention is described above with reference to the preferred embodiments. However, various changes of the present invention are possible without being limited to those embodiments. For example, the system for creating an index according to the second embodiment may have additional functions according to the third, fourth and fifth embodiments. This makes the system for creating an index, for example: in which information on an index to be created is notified to a database administrator; in which, after the notification, the index is automatically created upon an instruction of the database administrator; or in which, after the notification, the database administrator creates the index manually.

The functions according to the fourth and fifth embodiments may be added to the system for creating an index according to the first embodiment respectively. In those systems for creating an index, information on an index to be created may be notified to a database administrator, as described in the second and fifth embodiments, without automatically creating the index based on a created index definition.

In those systems for creating an index, after the notification, the index may be automatically created upon an instruction of the database administrator; or, after the notification, the database administrator may create the index manually.

In the embodiments, an XML document is used as a structured document. However, a structured document other than the XML document may be used.

The present invention is determined by the technical idea set forth in the claims without being limited to the embodiments as aforementioned.

The invention claimed is:

1. A method for creating an index for searching a structured document having a document data-structure stored, the method comprising the steps, to be performed by the computer, of:
analyzing the structured document to extract the document data-structure;
normalizing the extracted document data-structure to create a logical structure index composed of a plurality of elements having a hierarchical structure;
extracting an appearance number of a terminal element positioned at an end in the created logical structure index;
obtaining an element for creating an index for packaging a plurality of the terminal elements which have been counted among the extracted appearance number, having same element names, and are present in different hierarchical positions of the logical structure index, when comparing the extracted appearance number to a first predetermined threshold indicates that the extracted appearance number is larger than the first predetermined threshold; and
creating a packaged index from a path of the obtained element in the logical structure index.

2. The method according to claim 1, further comprising the step, to be performed by the computer, of, outputting a display screen including the extracted elements.

3. The method according to claim 2, further comprising the step, to be performed by the computer, of, if information instructing a creation of the index is obtained, creating a path of the extracted elements in the logical structure index as the index, after the step of outputting the display screen.

4. The method according to claim 1, further comprising the steps, to be performed by the computer, of:
extracting an appearance number of a set of elements having a hierarchical structure in the structured document; and
extracting another set of elements for which the index is created based on the logical structure index, by comparing the appearance number of the set of elements and a second predetermined threshold.

5. The method according to claim 1, further comprising the steps, to be performed by the computer, of:
extracting an appearance number of each element included in the extracted set of elements, in the structured document; and
extracting an element which is included in the extracted set of elements, and whose appearance number to a total appearance number of each element included in the extracted set of elements has a ratio larger than a second predetermined threshold, as an element for which an index is not created.

6. The method according to claim 4, further comprising the step, to be performed by the computer, of, outputting a display screen including the extracted element included in the set of elements and having larger than the second predetermined threshold.

7. A system for creating an index for searching a structured document having a document data-structure comprising:
a structured document registration unit for obtaining the structured document and storing the structured document in a storage unit in the system;
a document data-structure extraction processor for analyzing the stored structured document and extracting a document data-structure;
a logical structure index creation processor for normalizing the extracted document data-structure and creating a logical structure index composed of a plurality of elements having a hierarchical structure;
an element appearance control processor for extracting an appearance number of a terminal element positioned at an end in the created logical structure index;
an index definition creation processor for, obtaining an element for creating an index for packaging a plurality of the terminal elements which have been counted among the extracted appearance number, having same element names, and are present in different hierarchical positions of the logical structure index, when comparing the extracted appearance number to a first predetermined threshold indicates that the extracted appearance number is larger than the first predetermined threshold; and
a value index creation processor for creating a packaged index from a path of the obtained element in the logical structure index.

8. The system according to claim 7,
wherein the value creation processor comprises means for outputting a display screen including the extracted elements, and creating a path of the extracted elements in the logical structure index as an index, only if information instructing a creation of the index is obtained.

9. The system according to claim 7,
wherein the element appearance control processor further comprises means for extracting an appearance number of a set of elements composed of a plurality of elements having a hierarchical structure in the logical structure index, in the logical structure index;
wherein the index definition creation processor comprises means for extracting another set of elements for which an index is created based on the logical structure index, by comparing the appearance number of the extracted set of elements and a second predetermined threshold; and wherein the value creation processor comprises means for creating a path of the extracted set of elements in the logical structure index as the index.

10. The system according to claim 9, wherein the index definition creation processor extracts an appearance number of each element included in the set of elements, in the structured document, and further extracts an element which is included in the set of elements and whose appearance number to a total appearance number of each element included in the extracted set of elements has a ratio larger than a third predetermined threshold; and wherein the value creation processor does not create any path of the element which is included in the set of elements and whose appearance number has the ratio larger than the third predetermined threshold.

11. A computer-readable medium embodying a program for executing the method according to claim 1, by a computer storing a structured document having a document data-structure.

* * * * *

UNITED STATES PATENT AND TRADEMARK OFFICE
CERTIFICATE OF CORRECTION

PATENT NO.       : 7,711,726 B2                                    Page 1 of 1
APPLICATION NO.  : 11/689562
DATED            : May 4, 2010
INVENTOR(S)      : Iijima et al.

It is certified that error appears in the above-identified patent and that said Letters Patent is hereby corrected as shown below:

Please add Item (30), between items (65) and (51) as follows:

--(30)        Foreign Application Priority Data

Nov. 21, 2006    (JP)    .................... 2006-314008--.

Signed and Sealed this

Seventeenth Day of August, 2010

David J. Kappos
*Director of the United States Patent and Trademark Office*